(12) United States Patent
Hasegawa et al.

(10) Patent No.: US 6,878,284 B2
(45) Date of Patent: Apr. 12, 2005

(54) METHOD AND APPARATUS OF TREATING WATER CONTAINING A NITROGEN COMPOUND

(75) Inventors: Yoshitaka Hasegawa, Tokyo (JP); Brahim Messaoudi, Tokyo (JP); Toshiyuki Kamiya, Tokyo (JP); Junji Hirotsuji, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 161 days.

(21) Appl. No.: 10/398,912
(22) PCT Filed: Mar. 15, 2002
(86) PCT No.: PCT/JP02/02494
§ 371 (c)(1),
(2), (4) Date: Apr. 11, 2003
(87) PCT Pub. No.: WO02/094917
PCT Pub. Date: Nov. 28, 2002

(65) Prior Publication Data
US 2004/0007533 A1 Jan. 15, 2004

(30) Foreign Application Priority Data
May 21, 2001 (JP) ..................................... 2001-150576
Nov. 29, 2001 (JP) ..................................... 2001-364028

(51) Int. Cl.[7] ............................................... C02F 3/00
(52) U.S. Cl. ................. 210/660; 210/758; 210/754; 210/760; 210/673; 210/677; 210/903; 210/692; 210/694; 210/748

(58) Field of Search ................................ 210/660, 758, 210/754, 760, 673, 677, 903, 692, 694, 748

(56) References Cited

FOREIGN PATENT DOCUMENTS

| JP | 50-72443 | 6/1975 |
|---|---|---|
| JP | 54-31084 | 3/1979 |
| JP | 3-181390 | 8/1991 |
| JP | 4-367784 | 12/1992 |
| JP | 5-68880 | 3/1993 |
| JP | 6-335688 | 12/1994 |
| JP | 10-43745 | 2/1998 |

OTHER PUBLICATIONS

Hiro, N. et al.; "The Highly-Technology of . . . without Organic Compounds", *Japanese Lectures of 4$^{th}$ Symposium on Japan Society on Water Environment*, pp. 125–126 (Sep. 10, 2001).

*Primary Examiner*—Chester T. Barry
(74) *Attorney, Agent, or Firm*—Leydig, Voit & Mayer, Ltd.

(57) ABSTRACT

A method of treating water containing a nitrogen compound, and an apparatus of treating water containing a nitrogen compound at high speed without using a biologically unstable treatment causing eutrophication in lakes and swamps. The waste water is introduced into an adsorbing tank that is filled with a zeolite, only nitrogen components are adsorbed by the zeolite, a solution containing hypochlorous acid or hypobromous acid is introduced into the adsorbing tank, and the nitrogen adsorbed in the zeolite is decomposed by the hypochlorous acid or the hypobromous acid.

19 Claims, 17 Drawing Sheets

METHOD AND APPARATUS OF TREATING WATER CONTAINING A NITROGEN COMPOUND

TECHNICAL FIELD

The present invention relates to a method and an apparatus of treating water containing a nitrogen compound, particularly to a method and an apparatus of treating water containing a nitrogen compound in industrial wastewater and sewage, nitrogen being a substance causing eutrophication in lakes and swamps.

BACKGROUND ART

In recent years, environment has been deteriorated, i.e., a red tide and abnormal quantity of plankton in the lakes and swamps are produced by an increase in inflow amounts of industrial wastewater and sewage accompanied by an increase in population growth. It is considered that such environment deterioration is caused by eutrophication in the lakes and swamps with the nitrogen compound such as ammonia contained in the waste water flowing to the lakes and swamps. The removal of the nitrogen compound from the nitrogen compound-containing water becomes a problem to be addressed urgently.

As one method of solving such problem, there is a treatment method combining the step of adsorbing ammonia by contacting nitrogen compound-containing water with a zeolite based inorganic ion exchanger, and the step of regenerating the exchanger by desorbing the ammonia adsorbed to the inorganic ion exchanger using alkalis or salts, as disclosed in the Japanese Laid-Open Patent Publication 47454/1975. In such treatment method, firstly the sewage or waste water containing the ammonia ions is contacted with the zeolite based inorganic ion exchanger such as Clinoptilolite and mordenite to remove the ammonium ions, whereby the sewage or waste water is made harmless. Then, the ammonium ions adsorbed to the zeolite based inorganic ion exchanger is desorbed with alkalis, salts, or a mixing solution thereof using a conventional method. Alkali is added to the desorbing liquid containing the ammonium ions desorbed to expel them as ammonia gas using air, which is absorbed by a solution of sodium bichromate at normal temperature. The solution is heated and distilled, and distilled components are cooled and condensed to recover as aqueous ammonia.

As described above, the conventional method of treating the ammonia-containing water is to adsorb the ammonium ions to the zeolite based adsorbent, to desorb them into the liquid utilizing alkalis or salts, and to recycle them as the aqueous ammonia. However, the recycling of the ammonia is troublesome as described above, and there is a risk to flow the ammonia outside. The flow of the ammonia significantly affect external environment. Accordingly, there is recently needed to provide a safer method of treating the nitrogen compound-containing water such as the ammonia containing water.

DISCLOSURE OF INVENTION

According to the present invention, a method of treating a nitrogen compound-containing water comprises the steps of: adsorbing a nitrogen compound in the nitrogen compound-containing water to an adsorbent by contacting the nitrogen compound-containing water with the adsorbent, and decomposing the nitrogen compound by treating the adsorbent to which the nitrogen compound is adsorbed with an oxidizer-containing liquid.

Such treatment method can be used when the nitrogen compound is an ammonia nitrogen, ammonium salts, analogous ammonia structures, or a mixture thereof. Representative examples of such ammonium salts include a salt consisting of an ammonium ion such as ammonium chloride and ammonium sulfate and other component. Representative examples of such analogous ammonia structures include a substance in which hydrogen H of ammonia or ammonium ion is substituted with other substance, such as brolamine ($NH_2Br$, $NHBr_2$, $NBr_3$), TMAH ($N(CH_3)_4OH$) and the like.

In the treatment method, as the oxidizer, hypobromous acid can be used.

In the method of treating the nitrogen compound, the oxidizer-containing liquid used in the decomposing step can be recycled for decomposing a nitrogen compound. The oxidizer-containing liquid may be ozonized prior to the recycle of the oxidizer-containing liquid. When the oxidizer-containing liquid contains bromine ions, it is suitable that it can be converted into hypobromous acid by the ozonization.

The adsorbent is not especially limited as long as it has a property to adsorb the ammonia nitrogen. For example, an inorganic adsorbent can be used. Examples of such inorganic adsorbent include any of zeolite, activated carbon, and ion exchange resin or a combination thereof. Representative examples include an aluminum silicate compound, ammonium silicates, zeolites such as clinoptilolite and mordenite, clay minerals, silica alumina minerals such as clinoptilolite, mordenite, montmorillonite, sepiolite, bentonite and illite, calciums such as calcium oxide, calcium carbonate, calcium hydroxide, tuff, dolomite, and lime, activated cokes, inorganic ion exchangers such as strong acid ion exchange resin, and weak acid ion exchange resin, magnesia adsorbents, activated carbon, charcoal, terra abla, zirconium based fine ceramics and the like.

According to the present invention, an apparatus of treating a nitrogen compound-containing water comprises an introduction path for the nitrogen compound-containing water, an adsorbing means containing an adsorbent connected to the introduction path at one end and to a discharge path at the other end, an influent supplying means for introducing the nitrogen compound-containing water from the introduction path to the adsorbing means, adsorbing a nitrogen compound contained in the nitrogen compound-containing water, and then discharging it to the discharge path, and an oxidizer supplying means connected to the adsorbing means for introducing an oxidizer-containing liquid into the adsorbing means after the nitrogen compound is adsorbed, contacting the oxidizer-containing liquid with the adsorbent for a predetermined time, and decomposing the nitrogen compound adsorbed to the adsorbent.

Such apparatus of treating a nitrogen compound-containing water is preferable in that when the nitrogen compound is an ammonia nitrogen, ammonium salts, analogous ammonia structures, or a mixture thereof, harmless nitrogen is produced by decomposition. As the oxidizer, hypobromous acid can be preferably used to produce residual compound.

The apparatus of treating a nitrogen compound-containing water may comprise an oxidant-recycling means for recycling the oxidizer-containing liquid from the adsorbing means after the nitrogen compound is decomposed to recycle it for next decomposition of a nitrogen compound. Thus, the consumption of the oxidizer can preferably be reduced.

Such apparatus of treating a nitrogen compound-containing water comprises an ozonization means for ozonizing the oxidizer-containing liquid by contacting ozone with the oxidizer-containing liquid before the oxidizer-containing liquid is recycled.

The treatment apparatus can have a structure that the oxidizer-containing liquid used for the decomposing contains a bromine ion, and is converted into hypobromous acid by the ozonization.

The apparatus of treating a nitrogen compound-containing water can have a structure that comprises a washing agent injection means for injecting the washing agent to the adsorbing means after the oxidizer-containing liquid is recycled, a washing agent draining means for draining the washing agent from the adsorbing means, a washing agent for washing the adsorbing means by residing the washing agent to the adsorbing means for a predetermined time to decrease the amount of the oxidizer contained in the oxidizer containing liquid remained in the adsorbing means to a predetermined value or less. The washing agent may be, for example, pure water. Examples of the injection means include a shower.

In the treatment apparatus, as the adsorbent, an inorganic adsorbent can be used. It is preferable in that no concern over the deterioration by the oxidizer and the like, and highly reliable treatment apparatus can be provided. It is especially preferable that when the inorganic adsorbent be any of a zeolite, an activated carbon, an ion exchange resin, or a combination thereof, the treatment apparatus can well adsorb the nitrogen compound and be highly reliable.

In the method of treating a nitrogen compound-containing water according to the present invention, the oxidizer may be hypochlorous acid or hypobromous acid produced by electrolysis. The oxidizer-containing liquid used in the decomposing step may be recycled for decomposing a nitrogen compound. The oxidizer-containing liquid may be electrolyzed before the oxidizer-containing liquid is recycled.

In the method of treating a nitrogen compound-containing water, the oxidizer-containing liquid used in the decomposing step may contain a chlorine ion or a bromine ion, may be converted into hypochlorous acid or hypobromous acid by electrolysis, and the adsorbent may be an inorganic adsorbent. The inorganic adsorbent may comprise any of a zeolite, an activated carbon, an ion exchange resin, or a combination thereof.

The apparatus of treating a nitrogen compound-containing water according to the present invention may comprise an electrolyzing means at an upper side of the oxidizer supplying means wherein the oxidizer may be hypochlorous acid or hypobromous acid produced by electrolysis, and may comprise an oxidant-recycling means for recycling the oxidizer-containing liquid from the adsorbing means after the nitrogen compound is decomposed to recycle it for decomposing of a nitrogen compound. The oxidizer-containing liquid used for the decomposing may contain a chlorine ion or a bromine ion, and may be converted into hypochlorous acid or hypobromous acid produced by electrolysis.

The apparatus of treating a nitrogen compound-containing water may comprise a washing agent injection means for injecting the washing agent to the adsorbing means after the oxidizer-containing liquid is recycled, a washing agent draining means for draining the washing agent from the adsorbing means, a washing agent for washing the adsorbing means by residing the washing agent to the adsorbing means for a predetermined time to decrease the amount of the oxidizer contained in the oxidizer containing liquid remained in the adsorbing means to a predetermined value or less. The adsorbent may be an inorganic adsorbent. In the apparatus of treating a nitrogen compound-containing water, the inorganic adsorbent may comprise any of a zeolite, an activated carbon, an ion exchange resin, or a combination thereof.

BEST MODE FOR CARRYING OUT THE INVENTION

Embodiment 1

Figure 1:
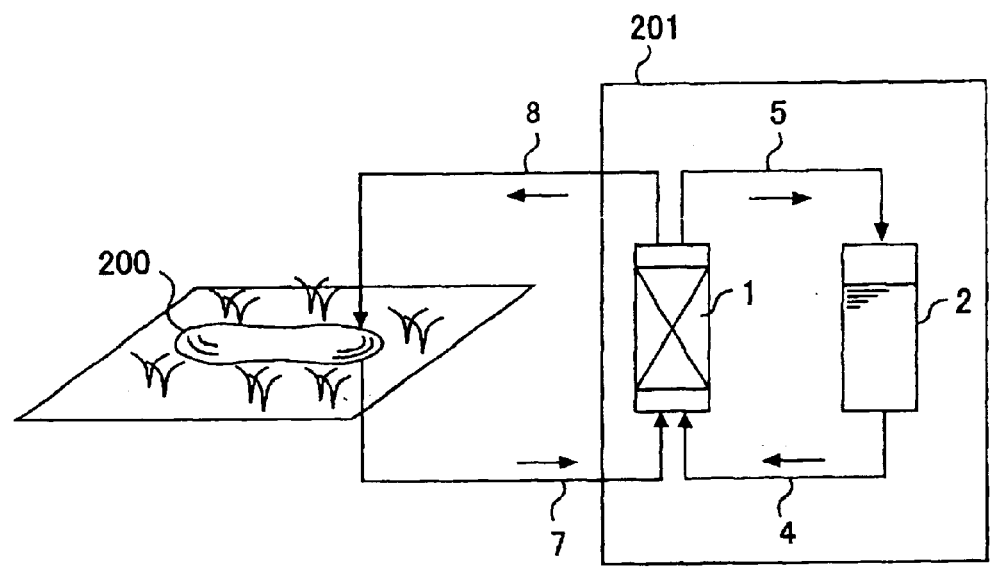
FIGS. 1 and 2 are diagrams of apparatuses of treating a nitrogen compound-containing water according to the present invention.

FIG. 1 shows an example showing a system configuration explanation drawing of an apparatus of treating a nitrogen compound-containing water according to the present invention. In such apparatus of treating a nitrogen compound-containing water 201, an influent containing a nitrogen compound such as ammonia is introduced into an adsorbing tank 1 via an influent injection line 7 from a lake or a swamp 200. The nitrogen compound such as ammonia is adsorbed with an adsorbent such as zeolite filled in the adsorbing tank 1 to provide treated water. Typical waste water contains about several tens mg/L (corresponds to tens ppm) or less of the nitrogen compound. For example, when the adsorbing tank 1 with an internal diameter of 1 m is almost 100% filled with the zeolite (Nitto zeolite No. 5 manufactured by Nitto Funka Kogyo KK) and a flow rate of the waste water into the adsorbing tank is about 20 L/min, it is found that the concentration of the nitrogen compound in the treated water after it passes through the adsorbing tank 1 is 5 mg/L or less. If the concentration of the nitrogen compound is 10 mg/L or less, "the treatment standard of the waste water regulated by lakes and swamps water preservation special provision (Kosyo Suisitu Hozen Tokubetu Sotihou, enforced in Jul. 27, 1984)" is fulfilled, and the treated water can be discharged into the lake or swamp. The influent passes through the adsorbing tank 1 under the above-mentioned conditions, and the nitrogen compound is removed therefrom to provide the treated water. The treated water is discharged outside from a treated water discharge line 8 via a valve 10, and is returned to the lake or the swamp 200 after it is confirmed that the amount of the nitrogen compound such as ammonia is the predetermined level or less. Once the predetermined amount of the nitrogen compound is adsorbed to the adsorbent such as zeolite filled in the adsorbing tank 1, a hypobromous acid-containing liquid stored in a hypobromous acid-containing liquid storage tank 2 is introduced into the adsorbing tank 1 through a hypobromous acid-containing liquid supply line 4. The hypobromous acid contained in the hypobromous acid-containing liquid introduced into the adsorbing tank 1 decompose the nitrogen compound such as ammonia adsorbed to the adsorbent, and produces harmless nitrogen.

A decomposition reaction of the nitrogen compound such as ammonia with such hypobromous acid is, for example, disclosed in detail in Japanese Laid-Open Patent Publication Hei.7-195087. The nitrogen produced by the decomposition reaction of the nitrogen compound is discharged to atmosphere as required from a nitrogen discharge outlet (not shown) disposed on the adsorbing tank 1. Bromine ions produced by the decomposition of the nitrogen compound and the hypobromous acid are discharged from the adsorbing tank 1 through a hypobromous acid-containing liquid discharge line 5 together with non-reacted hypobromous acid, and returned to the hypobromous acid-containing liquid storage tank 2. In such operation, when the zeolite 3 adsorbs the predetermined amount of the nitrogen compound, a pump 11 is stopped, a valve 10 is closed, and a valve 9 is open. Then, a pump 12 connected to the hypobromous acid-containing liquid supply line 4 is activated, and the hypobromous acid-containing liquid stored in the hypobromous acid-containing liquid storage tank 2 is injected into the adsorbing tank 1. The hypobromous acid-containing liquid passes through the adsorbing tank 1, and is discharged from a hypobromous acid-containing liquid discharge line 5. At this time, the nitrogen compound adsorbed to the zeolite 3 is converted into harmless nitrogen gas by oxidation with hypobromous acid, and is discharged to atmosphere from a nitrogen gas outlet 6. The zeolite 3 has recovered ability to adsorb the nitrogen compound, and will be used for the next influent treatment.

Figure 2:
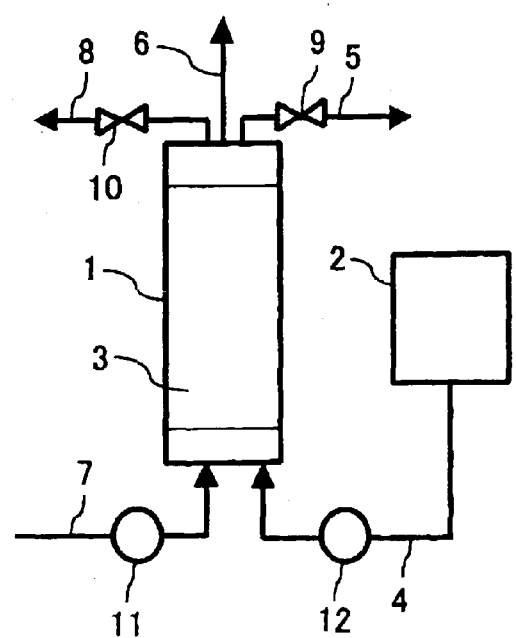

FIG. 2 shows an example showing a system configuration explanation drawing of an apparatus of treating a nitrogen compound-containing water according to the present invention. The operation of such apparatus will be described. In such treatment apparatus, firstly the valve 9 connected to the hypobromous acid-containing liquid discharge line 5 is closed, and the valve 10 connected to the treated water discharge line 8 is open. Then, the pump 11 is activated, an influent containing ammonia nitrogen is injected into the adsorbing tank 1 through the influent injection line 7, and the ammonia nitrogen in the influent is adsorbed to the zeolite 3. Thus, the ammonia nitrogen is removed from the influent to provide treated water, which is discharged from the treated water discharge line 8 via the valve 10. The above steps are repeated. When the zeolite 3 adsorbs the predetermined amount of the nitrogen compound, the pump 11 is stopped, the valve 10 is closed, and the valve 9 is open. Then, the pump 12 connected to the hypobromous acid-containing liquid supply line 4 is activated, and the hypobromous acid-containing liquid stored in the hypobromous acid-containing liquid storage tank 2 is injected into the adsorbing tank 1. The hypobromous acid-containing liquid passes through the adsorbing tank 1, and is discharged from the hypobromous acid-containing liquid discharge line 5. At this time, the ammonia nitrogen adsorbed to the zeolite 3 is converted into harmless nitrogen gas, water and hydrogen ions by oxidation with hypobromous acid, and the nitrogen gas is discharged to atmosphere from the nitrogen gas outlet 6. The water and the hydrogen ions are discharged together with hypobromous acid. The ammonia nitrogen is converted into the nitrogen gas, whereby the zeolite 3 has recovered ability to adsorb the nitrogen compound. In the present embodiment, two inlets and two outlets are disposed at the adsorbing tank 1. One inlet and one outlet may be disposed, and a three way valve may be disposed to select inlet and outlet paths.

In the above embodiment, a vertical type fixed bed adsorbing apparatus is used as an adsorbing means. The fixed bed adsorbing apparatus may be a horizontal type, or a radial flow type. As the adsorbing means, not only the fixed bed adsorbing apparatus, but also an alternating or crossflow (crossing) type moving bed adsorbing apparatus, a fluidized bed adsorbing apparatus, and the like may be used to provide, of course, the same advantages.

Figure 3:
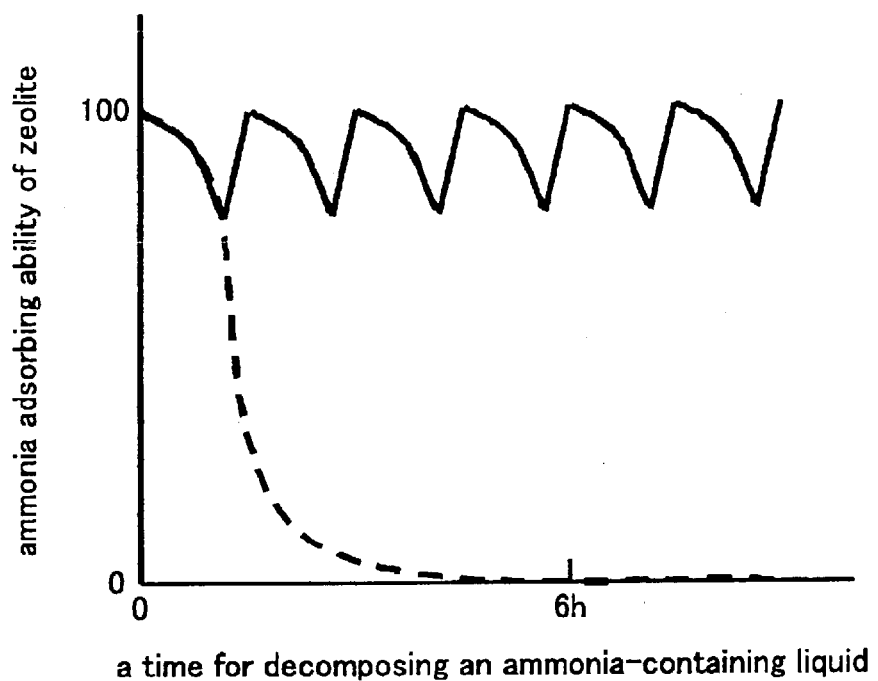
FIG. 3 is a graph showing treatment time of ammonia nitrogen, and a change in ammonia nitrogen adsorbing ability of zeolite as time elapsed.

FIG. 3 is a graph showing a change in ammonia adsorbing ability of zeolite as time elapsed, when ammonia ($NH_3$) is decomposed using the apparatus of treating a nitrogen compound-containing water according to the present invention. A vertical axis represents an ammonia adsorbing ability of the zeolite, and a horizontal axis represents a time for decomposing an ammonia-containing liquid. The ammonia adsorbing ability of the zeolite in the vertical axis is normalized so that an initial ammonia adsorbing ability of the zeolite is 100, and the state that the zeolite adsorbs no ammonia at all is 0. In a test, ammonia-containing water with the concentration of the ammonia nitrogen ($NH_4$—N) of 100 mg/L was used. The ammonia-containing water was introduced into the adsorbing tank 1 at a flow rate of 10 mL/min adjusted by the pump 11. The adsorbing tank 1 was filled with 30 g of the zeolite (Nitto zeolite No. 5 manufactured by Nitto Funka Kogyo KK). The concentration of hypobromous acid was adjusted to be 200 mg/L. The zeolite was regenerated by introducing the hypobromous acid with the adjusted concentration into an adsorbing tank 1 by the pump 12 at a flow rate of 10 mL/min. In the figure, the data represented by a solid line is obtained by oxidizing and decomposing the ammonia adsorbed to the zeolite with hypobromous acid per the predetermined time (per about 1 and half hour), and converting the ammonia into nitrogen to regenerate the zeolite (hereinafter, such regeneration treatment of the zeolite is also referred to as nitriding). The data represented by a doted line is obtained by nitriding no zeolite. When the zeolite was not nitrided, the adsorbing ability to the ammonia became nearly zero after about 6 hours. On the other hand, when the zeolite was regenerated by nitriding, the zeolite had the recovered ammonia adsorbing ability nearly to the original state.

Figure 4:
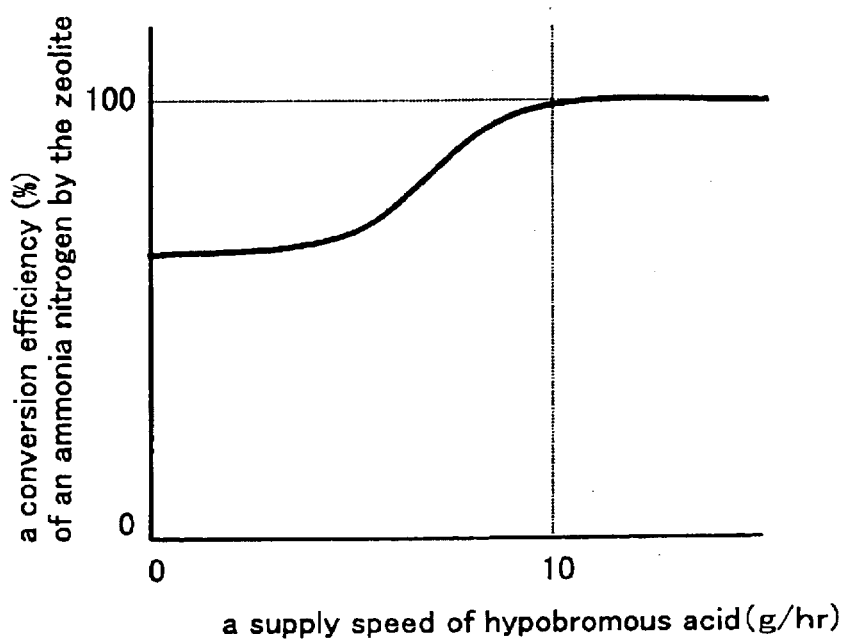
FIG. 4 is a graph showing a relation between a supply speed of hypobromous acid to zeolite, and conversion percentage of anunonia nitrogen to zeolite.

FIG. 4 is a graph showing a relation between a supply speed of hypobromous acid, and a conversion percentage of ammonia nitrogen in the apparatus of treating a nitrogen compound-containing water according to the present invention. A vertical axis represents a conversion efficiency (%) of the ammonia nitrogen by the zeolite. A horizontal axis represents the supply speed of hypobromous acid. Other experimental conditions are the same as in the test described for the case shown in FIG. 3. The present test reveals that an optimum value exists in the hypobromous acid supply speed in such treatment apparatus. Under the above-mentioned test conditions, the conversion percentage of the ammonia nitrogen become approximately 100% when the hypobromous acid supply speed is approximately 10 g/hr. Even if the hypobromous acid is supplied at higher speed, it only increases the hypobromous acid that does not contribute to the decomposition of the nitrogen compound. It is preferable that the supply speed of the hypobromous acid be set to the above-described optimum value, with a load of the pump used for supplying the hypobromous acid taking into consideration.

As described above, the method of treating nitrogen-containing water using the apparatus of treating a nitrogen compound-containing water in the present embodiment comprises the steps of adsorbing a nitrogen compound in the nitrogen compound-containing water to an adsorbent by contacting the nitrogen compound-containing water with the adsorbent, and decomposing the nitrogen compound by treating the adsorbent to which the nitrogen compound is adsorbed with an oxidizer-containing liquid. The nitrogen compound with the low concentration contained in the waste water is adsorbed to the adsorbent to increase the concentration. After that, the decomposition reaction with the oxidizer can be conducted. It is possible to efficiently treat the nitrogen compound such as the ammonia nitrogen contained in the industrial wastewater and the sewage. The adsorption of the nitrogen compound to the adsorbing means and the decomposition of the nitrogen compound by the hypobromous acid are performed in separated steps, whereby it can be prevented to flow the hypobromous acid of the oxidizer outside of the treatment apparatus, and it can be provided the method of treating a nitrogen compound-containing water having high safety to the external environment.

When the treatment method is applied to the ammonia nitrogen, ammonium salts, analogous ammonia structures, or a mixture thereof, the nitrogen compound is decomposed by the oxidizer to produce harmless nitrogen. It can be provided a more safety method of treating a nitrogen compound-containing water.

When the hypobromous acid is used as the oxidizer, no residual compounds are produced upon the nitrogen production. It can be provided the method of treating a nitrogen compound-containing water with easy maintenance and having high safety.

When the inorganic adsorbent is used as the adsorbent in the method of treating a nitrogen compound-containing water, it can be provided the method of treating a nitrogen compound-containing water with high reliability with no deterioration in the adsorbing property of the adsorbent by the oxidizer and the like. Especially when the inorganic adsorbent is any of zeolite, activated carbon, ion exchange resin, or a combination thereof, the ammonia nitrogen can be preferably adsorbed and removed stably, and be converted into the nitrogen gas.

The apparatus of treating a nitrogen compound-containing water in the present embodiment comprises an introduction path for the nitrogen compound-containing water, an adsorbing means containing an adsorbent connected to the introduction path at one end and to a discharge path at the other end, an influent supplying means for introducing the nitrogen compound-containing water from the introduction path to the adsorbing means, adsorbing a nitrogen compound contained in the nitrogen compound-containing water, and then discharging it to the discharge path, and an oxidizer supplying means connected to the adsorbing means for introducing an oxidizer-containing liquid into the adsorbing means after the nitrogen compound is adsorbed, contacting the oxidizer-containing liquid with the adsorbent for a predetermined time, and decomposing the nitrogen compound adsorbed to the adsorbent. Such treatment apparatus can increase the concentration of the nitrogen compound slightly contained in the waste water and the like by adsorbing it to the adsorbent. With the high concentration, the nitrogen compound can be decomposed by the oxidizer, whereby there can be provided the treatment apparatus with high decomposition efficiency. The harmful nitrogen compound can be decomposed to make harmless, and it can be provided the apparatus of treating a nitrogen compound-containing water having high safety.

Embodiment 2

Figure 5:
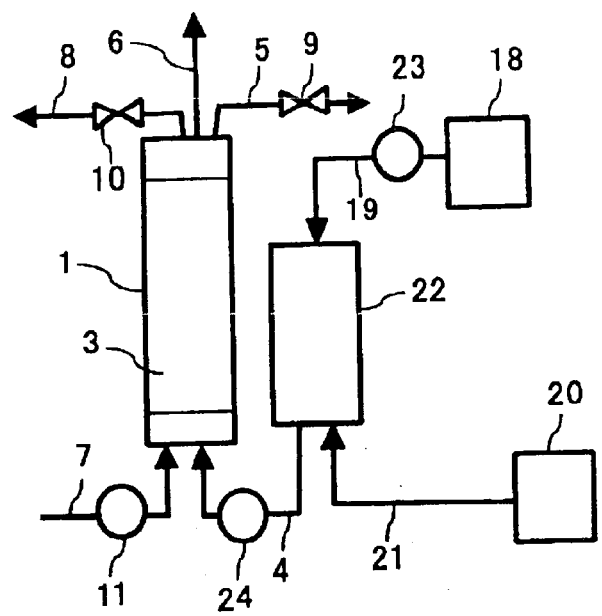
FIGS. 5 to 11 are diagrams of apparatuses of treating a nitrogen compound-containing water according to the present invention.

FIG. 5 shows an example showing a configuration explanation drawing of an apparatus of treating a nitrogen compound-containing water according to the present invention. The apparatus is configured so that is provided a hypobromous acid producing tank 22, a sodium bromide solution storing tank 18, a sodium bromide solution supply line 19, an ozonizer 20, an ozone-containing gas supply line 21, pumps 23, 24 instead of the hypobromous acid-containing storing tank 2 in the apparatus shown in FIG. 2. The hypobromous acid can be produced by reacting sodium bromide and ozone. With the apparatus configuration, ozone is added to the sodium bromide solution to produce the hypobromous acid-containing liquid, whereby there can be provided the apparatus of treating a nitrogen compound-containing water with high reliability in that chemically instable hypobromous acid having difficulty in storage can be provided stably.

According to the apparatus of treating a nitrogen compound-containing water, the oxidizer can be easily regenerated when the oxidizer-containing liquid is ozonized before the oxidizer-containing liquid is recycled. In addition, when the oxidizer-containing liquid used for the decomposing contains bromine ions, it can be preferably regenerated to hypobromous acid by ozonization.

Embodiment 3

Figure 6:
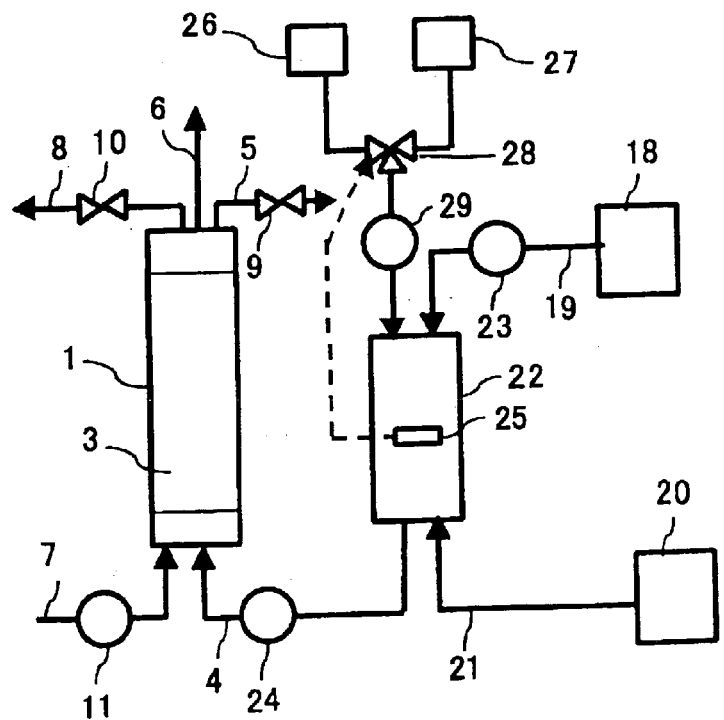

FIG. 6 shows an example showing a configuration explanation drawing of an apparatus of treating a nitrogen compound-containing water according to the present invention. A pH meter 25, a hydrochloric acid storing tank 26, a sodium hydroxide storing tank 27, and a three way valve 28 are added to the hypobromous acid production tank 22 in the apparatus shown in FIG. 5. An inlet is disposed at the top of the hypobromous acid production tank 22, which is connected to the hydrochloric acid storing tank 26 and the sodium hydroxide storing tank 27 via the three way valve 28. The hypobromous acid used as the oxidizer in the treatment apparatus of the present invention is stable under acid or neutral condition, but is dissociated to hypobromous acid ions under basic condition and is changed to bromic acid by reacting with ozone. It is important to control the pH of the hypobromous acid in order to stably change the nitrogen compound such as ammonia nitrogen and the like into the nitrogen gas.

In the apparatus of treating a nitrogen compound-containing water, the pH of the hypobromous acid-containing solution produced in the hypobromous acid production tank 22 is measured with the pH meter 25. The three way valve 28 is controlled depending on the value of the pH. A suitable amount of hydrochloric acid or sodium hydroxide is added using the pump 29 as required, whereby the pH can be kept neutral to acid. As a result, the production of harmful bromic acid is inhibited, and the waste consumption of ozone can be prevented. In the present embodiment, the pH meter is used as the means for measuring the pH of the hypobromous acid-containing liquid. Other pH measuring means such as litmus paper can provides similar effects. In order to adjust the pH, not only hydrochloric acid or sodium hydroxide, but also other acid or basic solutions such as sulfuric acid, nitric acid, potassium hydroxide, calcium hydroxide and the like may be used to provide the same advantages.

Embodiment 4

Figure 7:
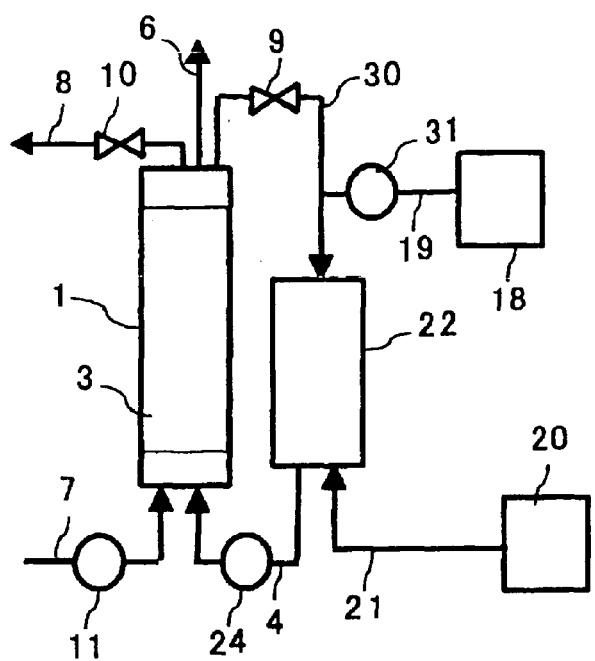

FIG. 7 shows an example showing a configuration explanation drawing of an apparatus of treating a nitrogen compound-containing water according to the present invention. A bromine ion-containing liquid recycling line 30 is disposed between the adsorbing tank 1 and the hypobromous acid production tank 22 shown in the-apparatus of FIG. 5.

In the apparatus of treating a nitrogen compound-containing water, the hypobromous acid-containing liquid produced in the hypobromous acid production tank 22 is injected into the adsorbing tank 1. The ammonia nitrogen adsorbed to the zeolite 3 is converted into the nitrogen gas. At this time, the hypobromous acid is converted into bromine ions, and the hypobromous acid-containing liquid discharged from the adsorbing tank 1 contains the bromine ions. The hypobromous acid-containing liquid discharged from the adsorbing tank 1 is sent to the hypobromous acid production tank 22 through the bromine ion-containing liquid recycling line 30, whereby the bromine ions contained therein can be recycled for producing the hypobromous acid. Thus, the amount of the bromine ion solution newly added can be reduced. When the hypobromous acid-containing liquid discharged from the adsorbing tank 1 is fully recycled, a pump 31 is stopped once the recycling of the bromine ion-containing liquid is started. If a new discharge line is disposed at the bromine ion-containing liquid recycling line 30, a part of the hypobromous acid-containing liquid discharged from the adsorbing tank 1 is discharged, and a part thereof is recycled, the flow rate may be adjusted without stopping the pump 31, and the bromine ion-containing liquid may be added so that the liquid amount in the hypobromous acid producing tank 22 is uniform. The bromine ion concentration in the solution flowing through the bromine ion-containing liquid recycling line 30 may be measured. When the bromine ion concentration of the solution recycled may be high, it may be fully recycled. When the bromine ion concentration of the solution recycled may be lowered, a part thereof may be recycled, or new bromine ion-containing water may be provided without recycling.

According to the apparatus of treating a nitrogen compound-containing water, when the oxidizer-containing liquid for use in the decomposing is recycled for the decomposing of a nitrogen compound, there is an advantage that the consumption of the oxidizer for use in the decomposing of the nitrogen compound can be reduced.

The present embodiment is described based on the apparatus shown in FIG. 5. Also, the bromine ion-containing liquid recycling line 30 is disposed between the adsorbing tank 1 and the hypobromous acid production tank 22 in the apparatus shown in FIG. 6, whereby the above-mentioned same advantages can be, of course, obtained in addition to the advantages obtained by the apparatus shown in FIG. 6.

Embodiment 5

Figure 8:
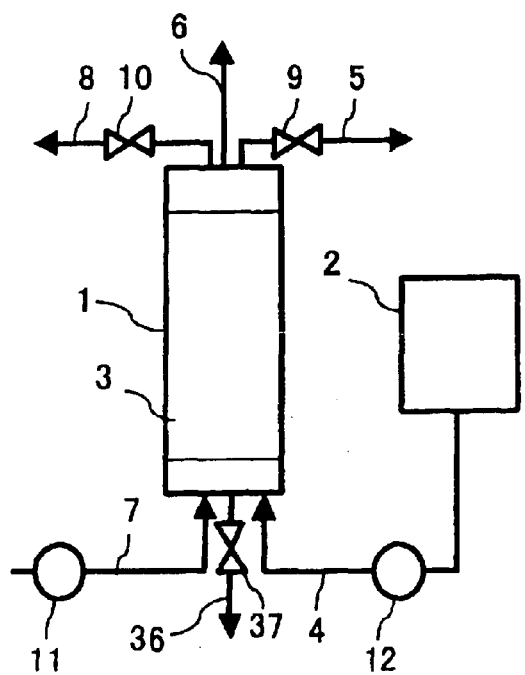

FIG. 8 shows an example showing a configuration explanation drawing of an apparatus of treating a nitrogen compound-containing water according to the present invention. In an apparatus of treating a nitrogen compound-containing water, a discharge valve 37 is attached to the adsorbing tank 1 shown in the apparatus of FIG. 2. It is configured so that the solution in the adsorbing tank 1 can be easily discharged with the discharge valve 37. In such treatment apparatus, firstly the valve 9 is closed, and the valve 10 is open. Then, the pump 11 is activated, an influent is injected into the adsorbing tank 1 through the influent injection line 7, and the ammonia nitrogen in the influent is adsorbed to the zeolite 3. The ammonia nitrogen is removed from the influent to provide treated water, which is discharged from the treated water discharge line 8. After the predetermined time is elapsed, the pump 11 is stopped, and the discharge valve 37 is open. The influent remained within the adsorbing tank 1 is discharged through a discharge line 36. After all influent within the adsorbing tank 1 is discharged, the discharge valve 37 and the valve 10 are closed. With the valve 9 is open, the pump 12 is activated, and the hypobromous acid-containing liquid stored in the hypobromous acid-containing liquid storage tank 2 is injected into the adsorbing tank 1 through the hypobromous acid-containing liquid supply line 4. At this time, the ammonia nitrogen adsorbed to the zeolite 3 is converted into the nitrogen gas by oxidation with hypobromous acid, and is discharged to atmosphere from the nitrogen gas outlet 6. The ammonia nitrogen is converted into the nitrogen gas, whereby the zeolite 3 has recovered ability to adsorb the ammonia nitrogen. After the step of converting the ammonia nitrogen adsorbed to the zeolite 3 into the nitrogen gas (hereinafter, also referred to as a denitrification step), the pump 12 is stopped, and the discharge valve 37 is open to discharge the hypobromous acid-containing liquid remained within the adsorbing tank 1 through the discharge line 36. The discharged water can contain bromine ions and bromic acid ions. Consequently, the discharged water is returned to the hypobromous acid-containing liquid storage tank 2, or preserved in a special storage tank, to prevent it from flowing outside of the system. After that, it returns to the adsorbing step. Repeating the above operation can remove the ammonia nitrogen in the influent repeatedly.

According to the apparatus of treating a nitrogen compound-containing water, the adsorbing tank 1 has the discharge valve 37, whereby it can be smoothly conducted from the adsorbing step of the ammonia nitrogen to denitrification step. The recycling percentage of the bromine ions can be improved, and it can be advantageously prevented harmful substances such as bromic acid from flowing outside of the system.

The present embodiment is described based on the apparatus shown in FIG. 2. Also, the discharge valve 37 is attached to the adsorbing tank 1 in the apparatuses shown in FIGS. 5 to 7, whereby the above-mentioned same advantages can be, of course, obtained.

Embodiment 6

Figure 9:
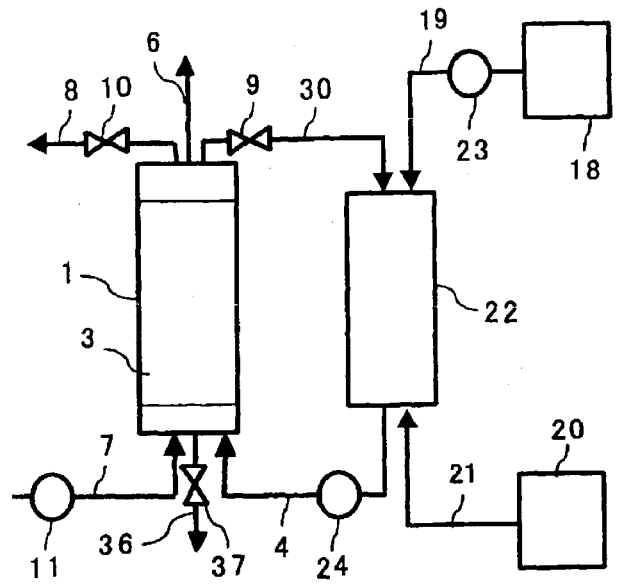

FIG. 9 shows an example showing a configuration explanation drawing of an apparatus of treating a nitrogen compound-containing water according to the present invention. In such apparatus of treating a nitrogen compound-containing water, the bromine ion-containing liquid recycling line 30 is attached as a connecting pipe for connecting the adsorbing tank 1 and the hypobromous acid production tank 22, and the discharge valve 37 is attached to the adsorbing tank 1 shown in the apparatus of FIG. 5. The hypobromous acid-containing liquid discharged from the adsorbing tank 1 can be sent to the hypobromous acid production tank 22 through the bromine ion-containing liquid recycling line 30, whereby the solution in the adsorbing tank 1 can be easily discharged.

In such apparatus of treating a nitrogen compound-containing water, firstly the valve 9 is closed, and the valve 10 is open as in the apparatus shown in FIG. 2. Then, the pump 11 is activated, an influent is injected into the adsorbing tank 1 through the influent injection line 7, and the ammonia nitrogen in the influent is adsorbed to the zeolite 3. The ammonia nitrogen is removed from the influent to provide treated water, which is discharged from the treated water discharge line 8. After the predetermined time is elapsed, the pump 11 is stopped, and the discharge valve 37 is open. The influent remained within the adsorbing tank 1 is discharged through a discharge line 36. After all influent within the adsorbing tank 1 is discharged, the discharge valve 37 and the valve 10 are closed. With the valve 9 is open, the pump 24 is activated, and the hypobromous acid-containing liquid stored in the hypobromous acid-containing liquid storage tank 2 is injected into the adsorbing tank 1 through the hypobromous acid-containing liquid supply line 4. At this time, the ammonia nitrogen adsorbed to the zeolite 3 is converted into the nitrogen gas by oxidation with hypobromous acid, and is discharged to atmosphere from the nitrogen gas outlet 6. The ammonia nitrogen is converted into the nitrogen gas, whereby the zeolite 3 has recovered ability to adsorb the nitrogen compound. After the denitrification step is completed, the pump 24 is stopped, and the discharge valve 37 is open to discharge the hypobromous acid-containing liquid remained within the adsorbing tank 1 through the discharge line 36. The discharged water can contain bromine ions and bromic acid ions. Consequently, the discharged water is introduced into to the hypobromous acid-containing liquid producing tank 22 to provide a feedstock for producing hypobromous acid, thereby preventing it from flowing outside of the system. The discharged water is stored temporarily in a special storage tank, and then is returned to the hypobromous acid producing tank 22 by the pump. After the denitrification step is completed, the discharge valve 37 may not be open, the pump 24 may be rotated reverse, and the hypobromous acid-containing liquid remained within the adsorbing tank 1 may be returned to the hypobromous acid producing tank 22. After that, it returns to the adsorbing step. Repeating the above operation can remove the ammonia nitrogen in the influent repeatedly.

According to the apparatus of treating a nitrogen compound-containing water, the adsorbing tank 1 has the discharge valve 37, whereby it can be smoothly conducted from the adsorbing step of the ammonia nitrogen to denitrification step. The recycling percentage of the bromine ions can be improved, and it can be advantageously prevented harmful substances such as bromic acid from flowing outside of the system. The hypobromous acid-containing liquid discharged from the adsorbing tank 1 is sent to the hypobromous acid production tank 22 through the bromine ion-containing liquid recycling line 30, whereby the bromine ions contained therein can be recycled for producing the hypobromous acid. Thus, the amount of the bromine ion solution newly added can be reduced.

Embodiment 7

Figure 10:
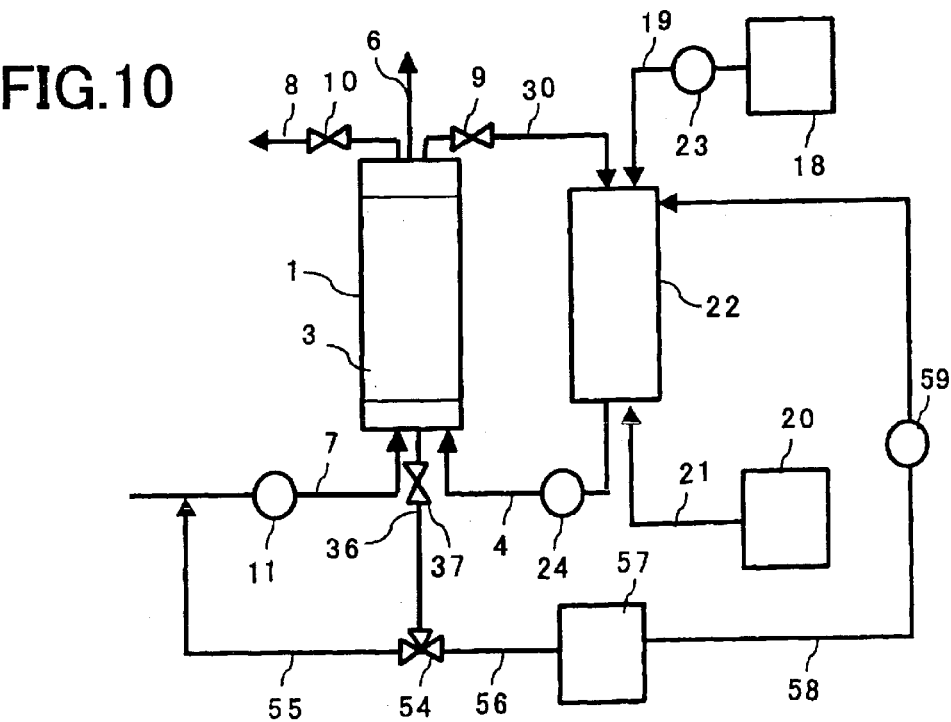

FIG. 10 shows an example showing a configuration explanation drawing of an apparatus of treating a nitrogen compound-containing water according to the present invention. In such apparatus of treating a nitrogen compound-containing water, the discharge line 37 is divided into two lines: an ammonia-containing water discharge line 55 and a bromine ion-containing water discharge line 56, and these paths can be controlled by a three way valve 54 shown in the apparatus of FIG. 9. The ammonia-containing water discharge line 55 is connected to the influent injection line 7. The bromine ion-containing water discharge line 56 is connected to a bromine ion discharge storage tank 57. The bromine ion discharge storage tank 57 is connected to the hypobromous acid production tank 22 via a bromine ion recycling line 58. A pump 59 is attached to the bromine ion recycling line 58. In the discharge step after the adsorbing step is completed, the discharge valve 37 is open, at the same time the three way valve 54 is operated. The discharge line 37 is connected to the ammonia-containing water discharge line 55. The ammonia-containing water remained within the adsorbing tank 1 after the adsorbing step is completed returns to the influent injection line 7, and is again injected into the adsorbing tank 1. In the discharge step after the denitrification step is completed, the discharge valve 37 is open, at the same time the three way valve 54 is operated. The discharge line 37 is connected to the bromine ion-containing water discharge line 56. The bromine ion-containing water remained within the adsorbing tank 1 after the denitrification step is completed is stored in the bromine ion discharge storage tank 57. The bromine ion-containing water stored in the bromine ion discharge storage tank 57 is poured into the hypobromous acid production tank 22 through the bromine ion recycling line 58 by activating the pump 59, and is reused as a feedstock for producing hypobromous acid.

According to the treatment apparatus, the discharge line 37 is divided into two lines: the ammonia-containing water discharge line 55 and the bromine ion-containing water discharge line 56, and these paths can be controlled by a three way valve 54. The bromine ion-containing water remained within the adsorbing tank 1 after the denitrification step is completed can be effectively recycled, and the bromine ions recycled can be recycled in the hypobromous acid production tank 22.

In the present embodiment, the discharge line 37 is divided into two lines: the ammonia-containing water discharge line 55 and the bromine ion-containing water discharge line 56, and these paths can be controlled by a three way valve 54. The ammonia-containing water discharge line 55 and the bromine ion-containing water discharge line 56 may be directly connected to the adsorbing tank 1, each of which may have a valve. The discharge path may be selected by opening and closing the valves. Alternatively, the bromine ion-containing water discharge line 56 may be connected to the hypobromous acid producing tank 22, to which the pump 59 may be attached. The pump 59 may be moved upon the discharge of the bromine ion-containing water, and the bromine ion-containing water remained within the adsorbing tank may be directly poured into the hypobromous acid producing tank 22.

Embodiment 8

Figure 11:
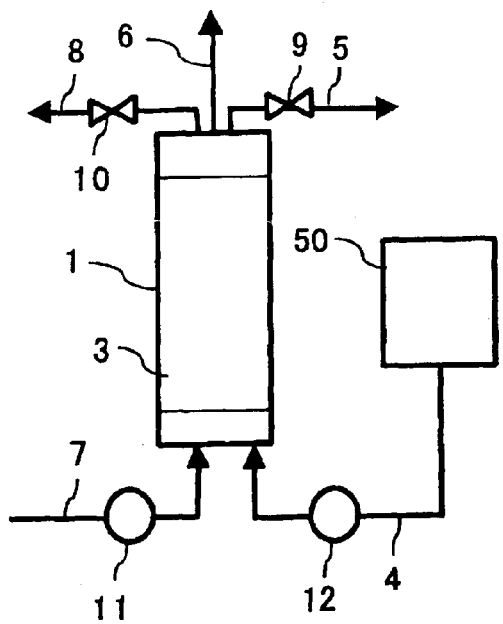

FIG. 11 shows an example showing a configuration explanation drawing of an apparatus of treating a nitrogen compound-containing water according to the present invention. Such treatment apparatus include a storage tank 50 for a mixture liquid of hypobromous acid and sodium chloride instead of the hypobromous acid-containing storing tank 2 shown in the apparatus of FIG. 2. The sodium ion has functions to improve the ability of the zeolite for adsorbing the ammonia nitrogen, and to promote the desorption of the ammonia nitrogen from the zeolite. The mixture liquid of the hypobromous acid and the sodium chloride is used for denitrifying the ammonia nitrogen adsorbed to the zeolite, whereby a balance between the denitrification speed of the ammonia nitrogen with the hypobromous acid, and the desorption speed of the ammonia nitrogen with the sodium ion, when the zeolite to which the ammonia nitrogen is adsorbed is contacted with the hypobromous acid. Thus, the nitrogen conversion efficiency of the ammonia nitrogen is improved. The zeolite is sodium treated, whereby the ammonia nitrogen adsorbing ability can be enhanced.

Figure 12:
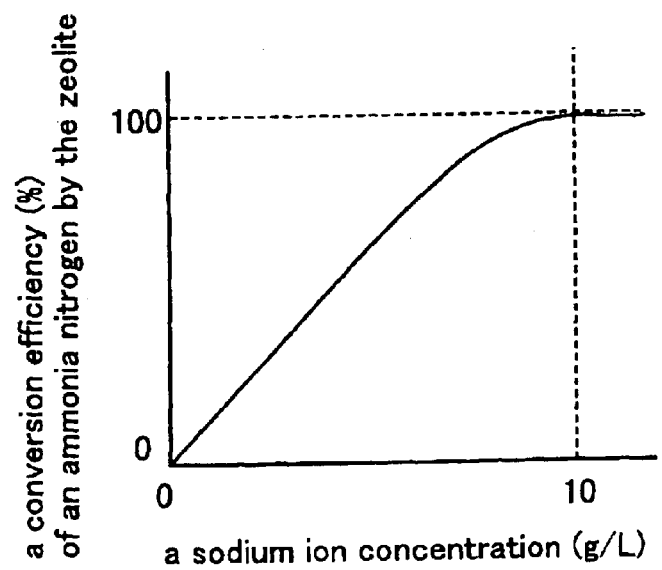
FIG. 12 is a graph showing an effect of Na+ concentration in hypobromous acid on a conversion percentage of ammonia nitrogen to zeolite.

FIG. 12 shows a data that confirms the effect of the sodium ion concentration contained in the hypobromous acid on the conversion efficiency of the ammonia nitrogen. A horizontal axis represents the sodium ion concentration (g/L), and a vertical axis represents an ammonia nitrogen conversion percentage (%) of the zeolite. The zeolite was the same as in the experiment described for the case shown in FIG. 3. The results reveal that the sodium ions improve the ammonia nitrogen conversion percentage of the zeolite.

The solution used for denitrification may be any solution containing hypobromous acid and sodium ions. The use of a mixture liquid of hypobromous acid and sodium salts can provide the same advantages. The present embodiment is described based on the apparatus shown in FIG. 2. Also, the sodium ions are contained in the hypobromous acid-containing liquid, whereby the above-mentioned same advantages can be, of course, obtained in the apparatuses shown in FIGS. 5 to 11.

Embodiment 9

Figure 13:
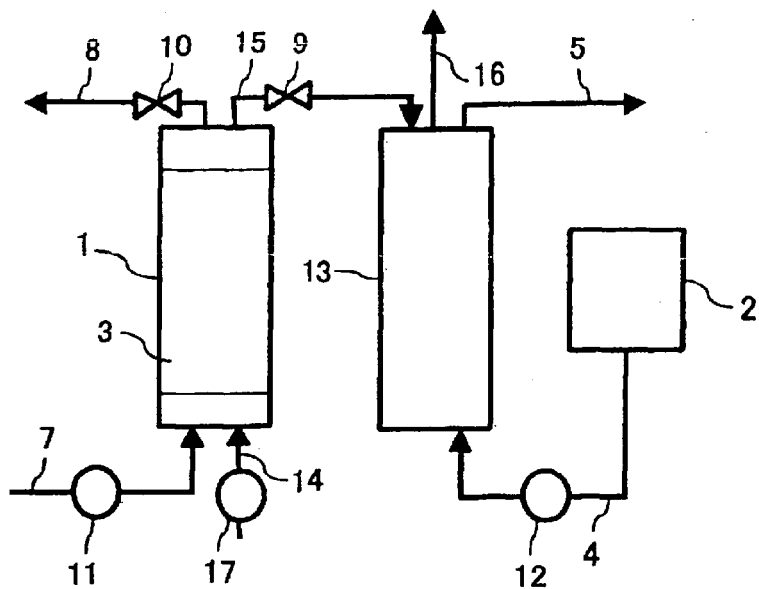
FIGS. 13 to 27 are diagrams of apparatuses of treating a nitrogen compound-containing water according to the present invention.

FIG. 13 shows an example showing a configuration explanation drawing of an apparatus of treating a nitrogen compound-containing water according to the present invention. Such treatment apparatus include a denitrification tank 13 shown in the apparatus of FIG. 2. The denitrification tank 13 has two inlets, and one outlet. To the inlet, a denitrified nitrogen-containing liquid transport line 15 and the hypobromous acid-containing liquid supply line 4 are connected. To the outlet, the hypobromous acid-containing liquid discharge line 5 is connected. The denitrified nitrogen-containing liquid transport line 15 is connected to the adsorbing tank 1. The solution in the adsorbing tank 1 can be transported to the denitrification tank 13. The hypobromous acid-containing liquid supply line 4 is connected to the hypobromous acid-containing liquid storage tank 2. A nitrogen gas outlet 16 is disposed at the top of the desorption tank 13, which can discharge the nitrogen gas produced in the desorption tank.

A sodium chloride solution injection line 14 is connected to the bottom inlet of the adsorbing tank. A pump 17 attached thereto is used to inject the sodium chloride solution into the adsorbing tank 1. To the treated water discharge line 8, the valve 10 is attached. To the denitrified nitrogen-containing liquid transport line 15, the valve 9 is attached. By operating them, a discharge path of the solution within the adsorbing tank 1 can be selected.

In such apparatus of treating a nitrogen compound-containing water, firstly the valve 9 is closed, and the valve 10 is open as in the apparatus shown in FIG. 2. Then, the pump 11 is activated, an influent is injected into the adsorbing tank 1 through the influent injection line 7, and the ammonia nitrogen in the influent is adsorbed to the zeolite 3. The ammonia nitrogen is removed from the influent to provide treated water, which is discharged from the treated water discharge line 8. After the predetermined time is elapsed, the pump 11 is stopped, the valve 10 is closed, and the valve 9 is open. A pump 17 is activated, and the sodium chloride solution is injected into the adsorbing tank 1 through the sodium chloride solution injection line 14. When the zeolite to which the ammonia nitrogen is adsorbed is contacted with the sodium chloride solution, the ammonia nitrogen has a property to be desorbed. Thus, the ammonia nitrogen adsorbed to the zeolite is desorbed in the sodium chloride solution, and is introduced into the denitrification tank 13 through the denitrified nitrogen-containing liquid transport line. The ammonia nitrogen adsorbed is desorbed, whereby the zeolite 3 has recovered ability to adsorb the ammonia nitrogen. After the predetermined time is elapsed, the pump 17 is stopped, and the pump 12 is activated with the valve 9 closed. The hypobromous acid-containing liquid within the hypobromous acid-containing liquid storage tank 2 is injected into the denitrification tank 13 through the hypobromous acid-containing liquid supply line 4. The hypobromous acid-containing liquid passing through the denitrification tank 13 is discharged through the hypobromous acid-containing liquid discharge line 5. At this time, the ammonia nitrogen in the sodium chloride solution is converted into the nitrogen gas by oxidation with hypobromous acid, and is discharged to atmosphere from the nitrogen gas outlet 16.

According to the apparatus of treating a nitrogen compound-containing water, the ammonia nitrogen desorbed from the zeolite 3 is contacted with the hypobromous acid-containing liquid, whereby the contact of the zeolite with the hypobromous acid is inhibited, and the deterioration of the zeolite is prevented. When the influent containing the high concentration of ammonia nitrogen is treated, and a large amount of ammonia is adsorbed to the zeolite in a short time, the ammonia is desorbed from the zeolite using this method to liberate it in the liquid, and then is reacted with the hypobromous acid, whereby the nitrogen conversion efficiency of the ammonia is increased, and the treatment time can be shorten.

In the present embodiment, the sodium chloride solution is used for desorbing the ammonia nitrogen from the zeolite. Since the sodium ions are involved in the desorption of the ammonia nitrogen from the zeolite, a solution containing the sodium ions such as a sodium bromide solution can be alternatively used to provide the similar advantages. When other adsorbent is used instead of the zeolite, a solution that desorbs the ammonia adsorbed to the adsorbent is used instead of the sodium chloride solution, whereby the similar advantages can be, of course, provided.

Embodiment 10

Figure 14:
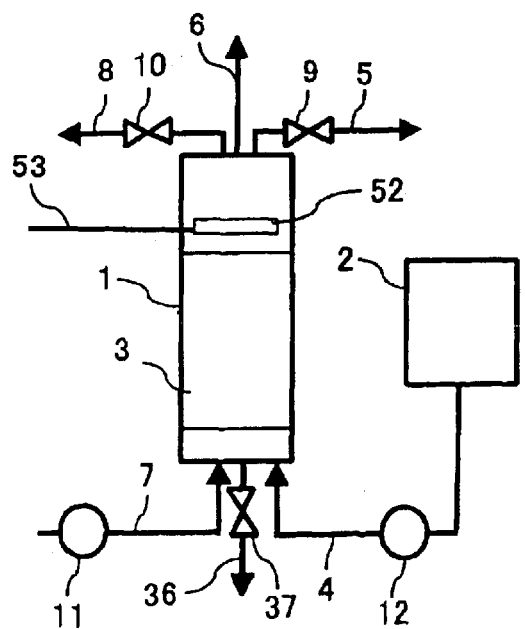

FIG. 14 shows an example showing a configuration explanation drawing of an apparatus of treating a nitrogen compound-containing water according to the present invention. In such treatment apparatus, a shower 52 is attached within the adsorbing tank 1, and a washing water supply line 53 is connected thereto shown in apparatus of FIG. 8. It is configured so that the adsorbent within the adsorbing tank 1 can be washed with a washing water, which is supplied through the washing water supply line 53, using the shower 52.

In the apparatus of treating a nitrogen compound-containing water, as in the apparatus shown in FIG. 8, firstly the valve 9 is closed, and the valve 10 is open. Then, the pump 11 is activated, an influent is injected into the adsorbing tank 1 through the influent injection line 7, and the ammonia nitrogen in the influent is adsorbed to the zeolite 3. The ammonia nitrogen is removed from the influent to provide treated water, which is discharged from the treated water discharge line 8.

After the predetermined time is elapsed, the pump 11 is stopped, and the discharge valve 37 is open. The influent remained within the adsorbing tank 1 is discharged through a discharge line 36. After all influent within the adsorbing tank 1 is discharged, the discharge valve 37 and the valve 10 are closed. With the valve 9 is open, the pump 12 is activated, and the hypobromous acid-containing liquid stored in the hypobromous acid-containing liquid storage tank 2 is injected into the adsorbing tank 1 through the hypobromous acid-containing liquid supply line 4. At this time, the ammonia nitrogen adsorbed to the zeolite 3 is converted into the nitrogen gas by oxidation with hypobromous acid, and is discharged to atmosphere from the nitrogen gas outlet 6. The ammonia nitrogen is converted into the nitrogen gas, whereby the zeolite 3 has recovered ability to adsorb the nitrogen compound. After the denitrification step is completed, the pump 12 is stopped, and the discharge valve 37 is open to discharge the hypobromous acid-containing liquid remained within the adsorbing tank 1 through the discharge line 36. The discharged water can contain bromine ions and bromic acid ions. Consequently, the discharged water is returned to the hypobromous acid-containing liquid storage tank 2, or preserved in a special storage tank, to prevent it from flowing outside of the system. The discharge valve 37 is open to jet the washing water supplied through the washing water supply line 53 from the shower 52 to conduct a washing step for washing the surface of the adsorbent. After the washing step is completed, the discharge valve 37 is closed, it is returned to the adsorbing step again. Even if the solution within the adsorbing tank is discharged after the denitrification, excessively administered hypobromous acid, the ammonia nitrogen remained without converting into nitrogen, harmful substances produced upon the nitrogen conversion reaction may remain on the surface of the adsorbent. If it proceeds to the adsorbing step, these contained in the treated water may be flowed outside of the system.

According to the treatment method, the washing step is conducted after the discharge step is completed after the denitrification step, the surface of the adsorbent is washed with the washing water to remove attached components, whereby it can be prevented to flow the hypobromous acid, the ammonia nitrogen, the harmful substance outside of the system.

As the washing method, the washing water jets from the shower 52. A washing water inlet and a washing water outlet may be disposed at the top and bottom of the adsorbing tank 1, and the washing water may pass through the adsorbent 3 to provide the same advantages. In this case, an injection direction of the washing water may be upward or downward.

The present embodiment is described based on the apparatus shown in FIG. 8. The washing means for the adsorbent 3 and the washing water supply means are attached to the adsorbing tank 1 in the apparatuses shown in FIGS. 9 to 11, which can provide, of course, the same advantages.

Embodiment 11

Figure 15:
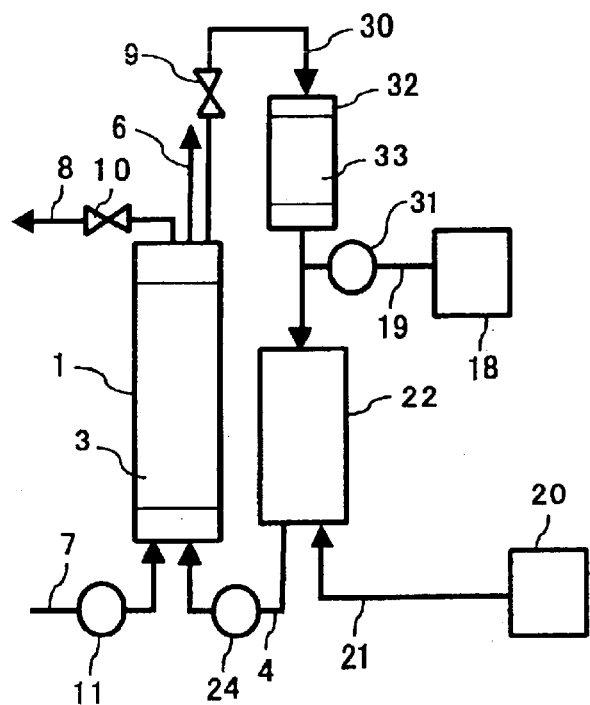

FIG. 15 shows an example showing a configuration explanation drawing of an apparatus of treating a nitrogen compound-containing water according to the present invention. In such an apparatus of treating a nitrogen compound-containing water, an activated carbon tank 32 and activated carbon 33 are attached to the bromine ion-containing liquid recycling line 30 shown in the apparatus of FIG. 7. The solution discharged from the adsorbing tank 1 contains bromine ions produced by the nitrogen gas conversion of the ammonia nitrogen, as well as excessively administered hypobromous acid. If the excess hypobromous acid is ozonized, bromic acid may be produced. It is therefore needed to adjust the amount of the hypobromous acid injected into the hypobromous acid producing tank 22 through the bromine ion-containing liquid recycling line 30 so that the amount of the hypobromous acid is not excessive. The activated carbon functions to adsorb the hypobromous acid. With such structure, the hypobromous acid in the hypobromous acid-containing liquid recycled can be adsorbed to recycle the bromine ions alone. As a result, the hypobromous acid can be advantageously produced stably.

The present embodiment is described based on the apparatus shown in FIG. 7. When the adsorbing tank 1 is connected to the hypobromous acid producing tank 22 via bromine ion-containing liquid recycling line 30 in the apparatuses shown in FIGS. 8 to 11, 13, and 14, there can, of course, provide the same advantages.

Embodiment 12

Figure 16:
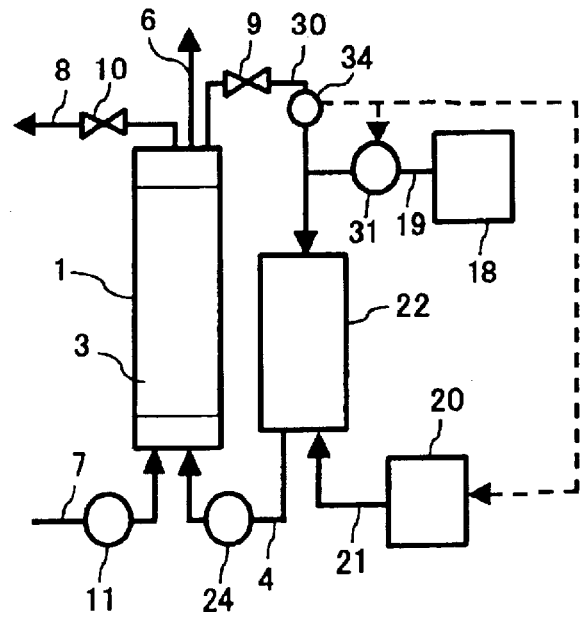

FIG. 16 shows an example showing a configuration explanation drawing of an apparatus of treating a nitrogen compound-containing water according to the present invention. In such an apparatus of treating a nitrogen compound-containing water, a bromine ion concentration meter 34 is attached to the bromine ion-containing liquid recycling line 30 shown in the apparatus of FIG. 7. It is configured so that the pump 31 attached to the sodium bromide solution supply line 19 and the ozonizer 20 are controlled by the measured value of the meter. The amount of the bromine ion produced by the nitrogen conversion of the ammonia nitrogen is not uniform. Therefore, the bromine ion concentration in the solution sent to the hypobromous acid producing tank 22 through the bromine ion-containing liquid recycling line is also not uniform. However, in order to produce bromic acid at a constant concentration stably, the bromine ion and ozone should be reacted at a constant ratio in the hypobromous acid producing tank 22.

According to the apparatus of treating a nitrogen compound-containing water, the bromine ion concentration meter 34 is attached to the bromine ion-containing liquid recycling line 30. By the measured value of the meter, the pump 31 attached to the sodium bromide solution supply line 19 and the ozonizer 20 are controlled. The supply amounts of the bromine ion-containing liquid and the ozone-containing gas are controlled to produce the hypobromous acid efficiently. As a result, the consumption of the bromine ion solution can be decreased.

In this embodiment, the pump 31 and the ozonizer 20 are automatically controlled by the value of the bromine ion concentration meter 34. The value of the bromine ion concentration meter 34 may be monitored manually to control the pump 31 and the ozonizer. By the value of the bromine ion concentration meter 34, both of the pump 31 and the ozonizer 20 are controlled. Either thereof may be fixed. The present embodiment is described based on the apparatus shown in FIG. 7. When the adsorbing tank 1 is connected to the hypobromous acid producing tank 22 via bromine ion-containing liquid recycling line 30, the apparatuses shown in FIGS. 8 to 11, 13, and 15, there can, of course, provide the same advantages.

Embodiment 13

Figure 17:
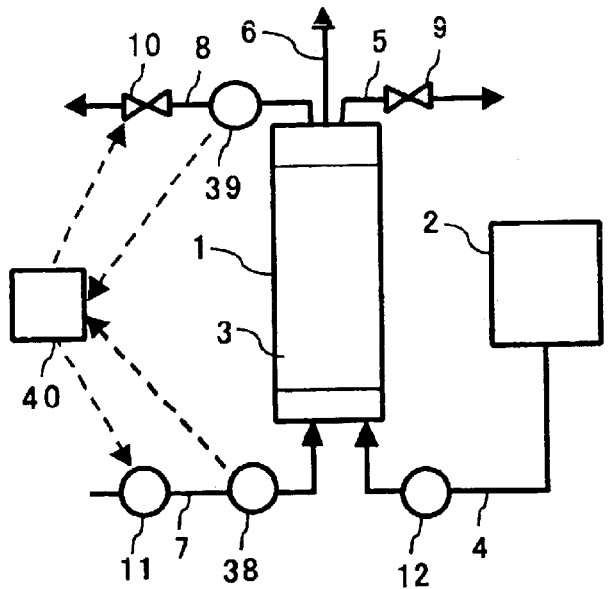

FIG. 17 shows an example showing a configuration explanation drawing of an apparatus of treating a nitrogen compound-containing water according to the present invention. Such treatment apparatus includes pH meters 38, 39 attached to the influent injection line 7 and the treated water discharge line 8, respectively shown the apparatus of FIG. 2. It is configured so that their measured values are taken into a controller 40, with which the pump 11 and the valve 10 are controlled. Harmful substances that may be produced by the conversion of the ammonia nitrogen into the nitrogen gas include bromic acid, nitrogen oxide and the like. When the denitrification step and the adsorbing step are repeated in the apparatus shown in FIG. 2, the harmful substances produced in the denitrification step can remain within the adsorbing tank 1, be dissolved into the treated water in the adsorbing step, and be discharged. With the above configuration, the existence of the harmful substances in the treated water can be detected.

In the adsorbing step, the pH of the influent is measured using the pH meter 38 before the influent is injected into the adsorbing tank 1 through the influent injection line 7 using the pump 11. The treated water from which the ammonia nitrogen is adsorbed within the adsorbing tank 1 is sent to the treated water discharge line 8. Before the treated water is discharged outside, the pH thereof is measured again using the pH meter 39. The measured values obtained by the pH meters 38 and 39 are transferred to the controller 40, where respective values are compared.

When the treated water discharged from the adsorbing tank 1 contains the above-mentioned harmful substances, these harmful substances are generally acid. Therefore, there is a difference between the values obtained by the pH meters 38 and 39. If there is the difference between the values obtained by the pH meters 38 and 39, the pump 11 controlled by the controller 40 is stopped, and the valve 10 is closed. Thus, discharging the treated water outside is discontinued. Also, the harmful substances can be detected when the concentration of the respective harmful substances in the treated water is measured. However, measuring concentrations of all harmful substances that can be contained in the treated water requires much time and labor. If any one of the harmful substance is contained in the treated water, the pH value thereof significantly varies as compared with that of the influent. Using the treatment method according to the present embodiment, the harmful substances can be detected quickly and easily, and discharging the harmful substance outside of the system can be prevented with certainty.

In the present embodiment, it is described that the discharge of the harmful substances is prevented by comparing the pH values. Electric conductivity, ionic strength, and oxidation-reduction potential of the water before and after it flows into the adsorbing tank, and their values are compared, whereby the same advantages can be provided. In the present embodiment, the pump 11 and the valve 10 are automatically controlled by the controller 40. The values of the pH meters 38 and 39 may also be monitored manually to control the pump 11 and the valve 10. The change in the pHs of the water before and after the water is injected into the adsorbing tank 1 is determined. The pH meter may be disposed within the adsorbing tank 1, and the pH change in the water within the adsorbing tank 1 may be determined to provide the similar advantages. In addition, other pH measuring means such as litmus paper can be used. If the pump 11 is controlled alone, the discharge of the treated water outside can be discontinued.

The present embodiment is described based on the apparatus shown in FIG. 2. The apparatuses shown in FIGS. 5 to 11, 13, to 16 can, of course, provide the same advantages.

Embodiment 14

Figure 18:
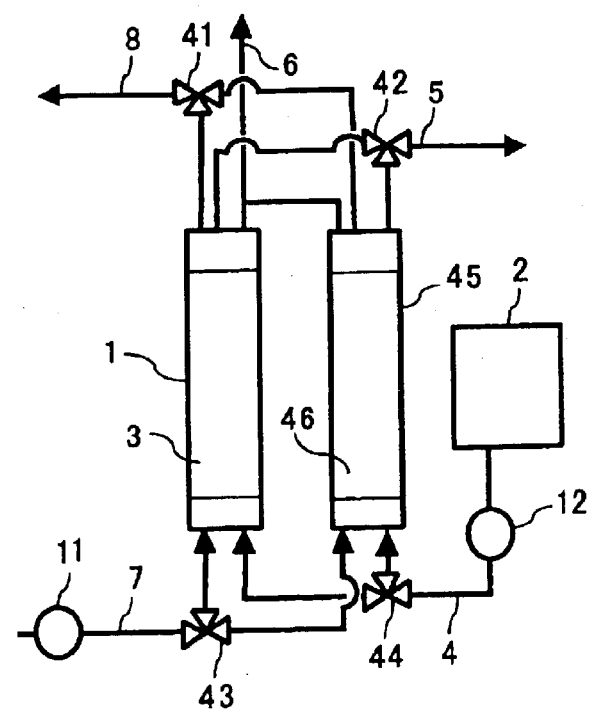

FIG. 18 shows an example showing a configuration explanation drawing of an apparatus of treating a nitrogen compound-containing water according to the present invention. Such treatment apparatus includes two adsorbing tanks shown in the apparatus of FIG. 2. To the hypobromous acid-containing liquid supply line 4, a three way valve 44 is attached. To the hypobromous acid-containing liquid discharge line 5, a three way valve 42 is attached. To the influent injection line 7, a three way valve 43 is attached. To the treated water discharge line 8, a three way valve 41 is attached. By controlling the switching of respective lines, the switching of the inlet path to the adsorbing tanks 1 and 45, and the outlet path from the adsorbing tanks 1 and 45 can be controlled. To the adsorbing tank for the adsorbing step, the influent injection line 7 and the treated water discharge line 8 are connected. To the adsorbing tank for the denitrification step, the hypobromous acid-containing liquid supply line 4 and the hypobromous acid-containing liquid discharge line 5 are connected.

According to the apparatus of treating a nitrogen compound-containing water, when the adsorbing step is conducted in the adsorbing tank 1, the denitrification step is conducted in the adsorbing tank 45; or when the adsorbing step is conducted in the adsorbing tank 45, the denitrification step is conducted in the adsorbing tank 1, whereby the efficiency of treating water can be improved with the same treatment time. In this embodiment, the apparatus includes two adsorbing tanks. The apparatus including more than two adsorbing tanks may provide the similar advantages. In proportion to the number of the adsorbing tanks included, the efficiency of treating water is improved. The three way valves are used for controlling respective lines. A valve may be attached to each branch of the lines, and may control the switching of the lines.

The present embodiment is described based on the apparatus shown in FIG. 2. The apparatuses shown in FIGS. 5 to 11, 13, to 17 can, of course, provide the same advantages.

Embodiment 15

Figure 19:
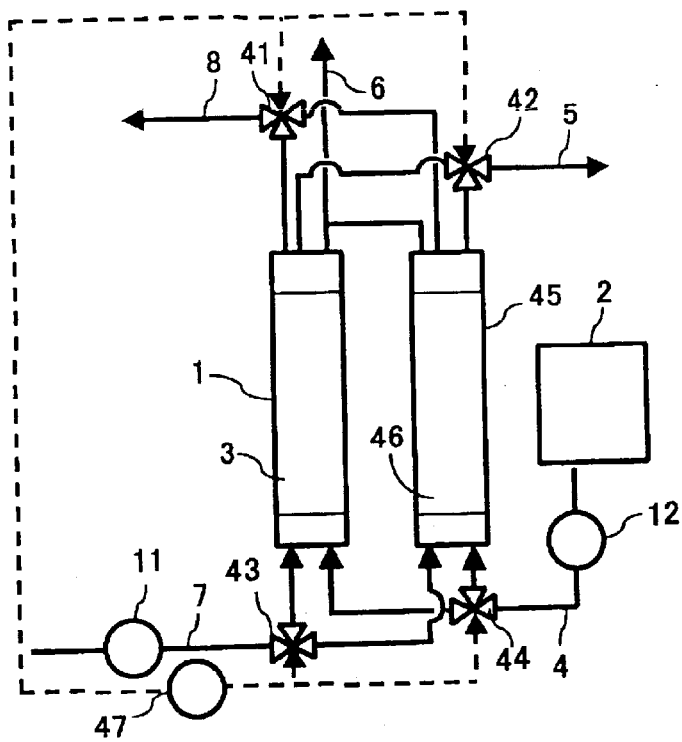

FIG. 19 shows an example showing a configuration explanation drawing of an apparatus of treating a nitrogen compound-containing water according to the present invention. Such treatment apparatus has a structure that a timer 47 is attached to the three way valves. 41, 42, 43, 44 for controlling the switching respective lines shown in the apparatus of FIG. 18. To the hypobromous acid-containing liquid supply line 4, a three way valve 44 is attached. To the hypobromous acid-containing liquid discharge line 5, a three way valve 42 is attached. To the influent injection line 7, a three way valve 43 is attached. To the treated water discharge line 8, a three way valve 41 is attached. By controlling the switching of respective lines, the switching of the inlet path to the adsorbing tanks 1 and 45, and the switching of the outlet path from the adsorbing tanks 1 and 45 can be controlled. To the adsorbing tank for the adsorbing step, the influent injection line 7 and the treated water discharge line 8 are connected. To the adsorbing tank for the denitrification step, the hypobromous acid-containing liquid supply line 4 and the hypobromous acid-containing liquid discharge line 5 are connected.

According to the apparatus of treating a nitrogen compound-containing water, when the adsorbing step is conducted in the adsorbing tank 1, the denitrification step is conducted in the adsorbing tank 45; or when the adsorbing step is conducted in the adsorbing tank 45, the denitrification step is conducted in the adsorbing tank 1, whereby the efficiency of treating water can be improved with the same treatment time. In addition, the three way valves 41, 42, 43, 44 are switched using the timer 47 per the predetermined time, whereby the adsorbing step and the denitrification step can be switched automatically, and it is possible to run the apparatus continuously.

In this embodiment, the apparatus includes two adsorbing tanks. The apparatus including more than two adsorbing tanks may provide the similar advantages. In proportion to the number of the adsorbing tanks included, the efficiency of treating water is improved. The three way valves are used for controlling respective lines. A valve may be attached to each branch of the lines, and may control the switching of the lines.

Embodiment 16

Figure 20:
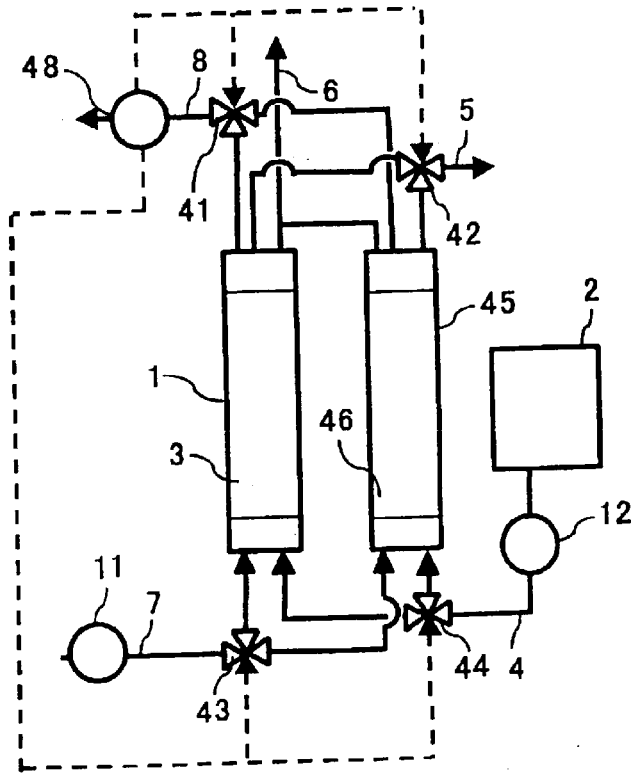

FIG. 20 shows an example showing a configuration explanation drawing of an apparatus of treating a nitrogen compound-containing water according to the present invention. In such treatment apparatus, a nitrogen concentration meter 48 is attached to the treated, water discharge line 8 of the apparatus shown in FIG. 18. Firstly, the adsorbing step is conducted in the adsorbing tank 1, and the denitrification step is conducted in the adsorbing tank 45. The concentration of the ammonia nitrogen contained in the treated water is measured by the nitrogen concentration meter 48. When the concentration of the ammonia nitrogen in the treated water reaches to the reference value or more, it is recognized that the zeolite 3 within the adsorbing tank 1 has decreased adsorbing ability of the ammonia nitrogen. The three way valves 41, 42, 43, 44 are switched. The adsorbing step is conducted in the adsorbing tank 45, and the denitrification step is conducted in the adsorbing tank 1. When the concentration of the ammonia nitrogen in the treated water again reaches to the reference value or more, it is recognized that the zeolite 46 within the adsorbing tank 45 has decreased adsorbing ability of the ammonia nitrogen. The three way valves 41, 42, 43, 44 are switched. The adsorbing step is conducted in the adsorbing tank 1, and the denitrification step is conducted in the adsorbing tank 45.

According to such apparatus of treating a nitrogen compound-containing water, repeating the above-described operation can keep the concentration of the ammonia nitrogen in the treated water to the reference value or less with certainty. The three way valves are switched automatically using the value of the nitrogen concentration meter 48, whereby the apparatus can be run continuously. The same advantages can be obtained, when an operator monitors the value of the nitrogen concentration meter 48, and switches the three way valve manually.

Embodiment 17

Figure 21:
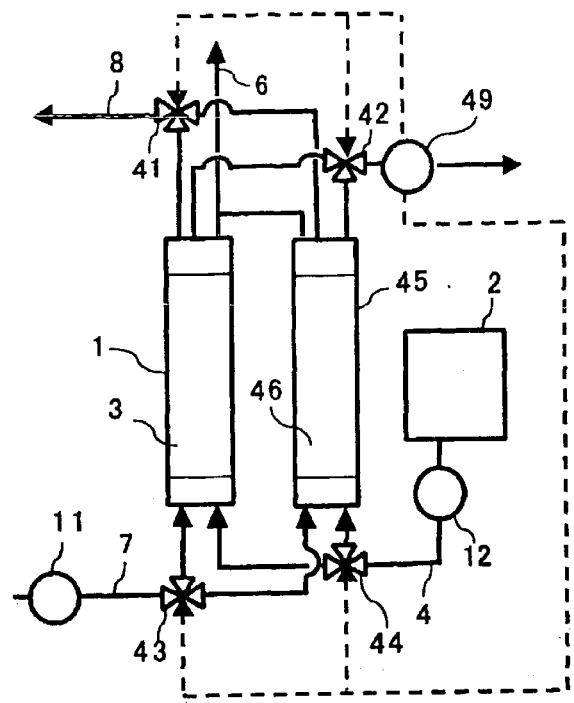

FIG. 21 shows an example showing a configuration explanation drawing of an apparatus of treating a nitrogen compound-containing water according to the present invention. In such treatment apparatus, a chromaticity sensor 49 is attached to the hypobromous acid-containing liquid discharge line 5 of the apparatus shown in FIG. 18. Once the hypobromous acid is reacted with the ammonia nitrogen, it is changed to bromine ions. The bromine ion-containing liquid is colorless and transparent, while the hypobromous acid-containing liquid is yellow. In other words, when the solution discharged from the adsorbing tank is colorless and transparent, all hypobromous acid injected is reacted with the ammonia adsorbed to the zeolite, which means no excess hypobromous acid exists. When the solution discharged from the adsorbing tank is yellow, the ammonia adsorbed to the zeolite is entirely reacted, which means excess hypobromous acid exists. The switching of the lines are controlled by the color of the solution flowing through the hypobromous acid-containing liquid discharge line 5.

Firstly, the adsorbing step is conducted in the adsorbing tank 1, and the denitrification step is conducted in the adsorbing tank 45. The color of the solution flowing through the hypobromous acid-containing liquid discharge line 5 is determined by the chromaticity sensor 49. Once the solution is started to be colored, and the chromaticity reaches to the reference value or more, it is recognized that the zeolite 46 within the adsorbing tank 45 is entirely denitrified. The three way valves 41, 42, 43, 44 are switched. The adsorbing step is conducted in the adsorbing tank 45, and the denitrification step is conducted in the adsorbing tank 1. The color of the solution flowing through the hypobromous acid-containing liquid discharge line 5 is again determined by the chromaticity sensor 49. Once the solution is started to be colored, and the chromaticity reaches to the reference value or more, it is recognized that the zeolite 3 within the adsorbing tank 1 is entirely denitrified. The three way valves 41, 42, 43, 44 are switched. The adsorbing step is conducted in the adsorbing tank 1, and the denitrification step is conducted in the adsorbing tank 45.

According to such apparatus of treating a nitrogen compound-containing water, repeating the above-described operation can convert the ammonia adsorbed to the zeolite entirely into the nitrogen gas, whereby excess administration of the hypobromous acid can be prevented. The three way valves are switched automatically using the value of the chromaticity sensor, whereby the apparatus can be run continuously. The same advantages can be obtained, when the operator monitors the value of the chromaticity sensor, and switches the three way valve manually. Furthermore, the same advantages can be obtained, when the three way valves are operated based on the color of the solution, as long as a means for determining the color of the solution flowing through the hypobromous acid-containing liquid discharge line 5, since an end of the denitrification step can be easily visual-inspected.

The present embodiment is described based on the apparatus shown in FIG. 18. Also, the chromaticity sensor 49 is attached to the hypobromous acid-containing liquid discharge line 5 or the bromine ion-containing liquid recycling line 30 in the apparatuses shown in FIGS. 2, 5 to 11, and 13 to 17 whereby the above-mentioned same advantages can be, of course, obtained.

Embodiment 18

Figure 22:
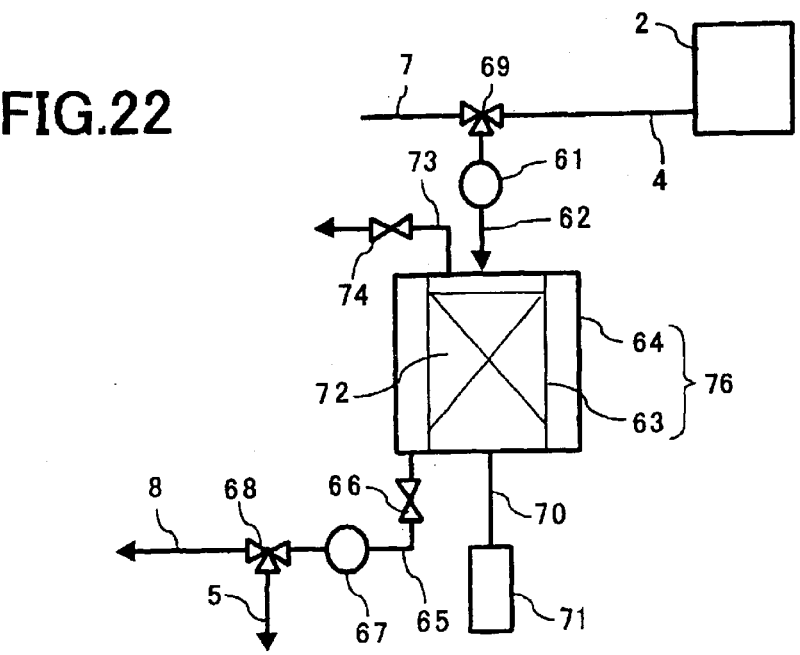

FIG. 22 shows an example showing a configuration explanation drawing of an apparatus of treating a nitrogen compound-containing water according to the present invention. In such treatment apparatus, a moving bed adsorbing apparatus 76 is used instead of the adsorbing tank 1 shown in the apparatus of FIG. 2.

The moving bed adsorbing apparatus 76 consists of two tanks: an outer tank 64, and an agitating tank 63. A cylindrical agitating tank 63 is in a center of the outer tank 64. At the bottom, a solution discharge line 65 is attached that can be open or closed optionally with a discharge valve 66. A pump 67 attached to the solution discharge line 65 is activated to open the discharge valve 66, whereby the solution within the outer tank 64 can be discharged. A motor 71 is connected to the bottom center of the agitating layer 63 via a rotation axis 70, a gas exhaust 73 and a solution injection line 62 are connected to the top of the agitating tank 63, and the agitating tank 63 is filled with zeolite powder 72 inside. An exhaust valve 74 attached to the gas exhaust 73 can be open to diffuse the gas produced in the agitating tank to atmosphere. A pump 61 attached to the solution injection line 62 can be activated to inject the solution into the agitating tank 63. The motor 70 can be activated to rotate the agitating tank 63 at any rotating number. A side wall of the agitating tank 63 is made of two sheets that include a number of smaller holes than a particle size of the zeolite powder 72. The two sheet can be slid each other to open and close the holes of the side wall. With the holes of the side wall closed, the solution is injected, and the motor 70 is activated to rotate the agitating tank 63, whereby the solution injected and the zeolite powder 72 can be agitated. With the agitating tank 63 rotated, the holes of the side wall are open, whereby the solution can be transferred to the outer tank 64 by centrifugal force. At this time, the solution is separated from the zeolite powder 72. In this embodiment, the side wall of the agitating tank 63 is made of the two sheets that include a number of smaller holes than the particle size of the zeolite powder 72. The side wall may have a structure that the zeolite powder 72 is not passed, and the solution is passed, but optionally the solution is not passed. The side wall may have a structure that has a permeation film having smaller holes than the particle size of the zeolite powder 72 at a gap that can be open or closed by a shutter mechanism and the like.

The hypobromous acid-containing liquid supply line 4 and the influent injection line 7 are connected to the solution injection line 62 via the three way valve 69. A path for injecting the solution into the agitating tank 63 can be selected by the three way valve 69. The hypobromous acid-containing liquid supply line 4 is connected to the hypobromous acid-containing liquid storage tank 2. The hypobromous acid-containing liquid discharge line 5 and the treated water discharge line 8 are connected to the solution discharge line 65 via the three way valve 68. A path for discharging the solution from the agitating tank 63 can be selected by the three way valve 68. Firstly, the holes of the side wall of the agitating tank 63, the discharge valve 66, and the gas exhaust valve 74 are closed, the three way valve 69 is operated to connect the solution injection line 62 and the influent injection line 7, and the pump 61 is activated to inject the influent into the agitating tank 63. While the amount of the influent injected is kept uniform, an activation duration of the pump 61 may be determined by calculating from the flow rate of the pump 61 and a liquid flowing period, or may be decided by a water level of the agitating tank 63. When the activation duration of the pump 61 is decided by the water level of the agitating tank, the water level of the agitating tank 63 is measured using a level meter and the like, whereby the pump 61 may be controlled automatically. Or, the operator may monitor the agitating tank 63 to control the pump 63 manually. Hereinafter, this step is referred to as an influent injecting step. After the predetermined amount of the influent is injected into the agitating tank 63, the pump 61 is stopped, the motor 71 is activated to rotate the agitating tank 73, whereby the influent and the zeolite powder 72 are agitated. The agitation is continued until the concentration of the ammonia nitrogen in the influent within the agitating tank 63 is decreased to the predetermined level. The motor 71 may be controlled by a time required to decrease the concentration of the ammonia nitrogen in the influent within the agitating tank 63 to the predetermined level that is determined by conducting an experiment under the same condition in advance, or may be controlled by measuring the value of the concentration of the ammonia nitrogen in the influent within the agitating tank 63 during agitation. In either case, the motor 71 may be controlled automatically by an automatic device using a time control means and a means for measuring the concentration of the ammonia nitrogen, or manually by the operator. Hereinafter, this step is referred to as an agitating step.

After the predetermined agitating time is past, the side wall of the agitating tank 63 is slid to open the holes to separate the zeolite powder 72 and the solution. The solution within the agitating tank 63 is transferred to the outer tank 64 by centrifugal force. The zeolite powder 72 cannot pass through the holes of the side wall of the agitating tank 63, and remains in the agitating tank 63. The solution separated and recycled in the outer tank 64 is the treated water. The holes disposed on the side wall of the agitating tank 63 may be open or closed after the motor 71 is stopped temporarily, and the rotation of the agitating tank 63 is stopped. In this case, the motor 71 is needed to be reactivated. This step is continued until the solution in the agitating tank 63 is entirely transferred to the outer tank 64. A step duration may be controlled automatically by the time determined by conducting an experiment under the same condition in advance, and by an automatic device using a time controlling means; or may be controlled manually with the operator by monitoring the agitating tank 63. In order to fully separate the solution within the agitating tank 63, the revolution speed of the agitation tank 63 may be greater than that in the agitating step. Hereinafter, this step is referred to as a zeolite dewatering step. After the zeolite dewatering step is completed, the motor 71 is stopped, the three way valve 68 is operated to connect the discharge line 65 and the treated water discharge line 8, and the solution discharge valve 66 is open to activate the pump 67, whereby the treated water within the outer tank 64 is discharged. An activation duration of the pump 67 is until the treated water within the outer tank 64 is fully discharged, and may be determined by calculating from the amount of the treated water and the flow rate of the pump 67, or may be decided by a water level of the outer tank 64. When the activation duration of the pump 67 is decided by the water level of the outer tank 64, the water level of the outer tank 64 can be measured using a level meter and the like, whereby the pump 67 may be controlled automatically. Or, the operator may monitor the outer tank 64 to control the pump 67 manually. Hereinafter, this step is referred to as a treated water discharging step.

After the treated water in the outer tank 64 is fully discharged, the pump 67 is stopped, the discharge valve 66 and the holes of the side wall of the agitating tank 63 are closed, the gas exhaust valve 74 is open, the three way valve 69 is operated to connect the solution injection line 62 and the hypobromous acid-containing liquid supply line 4, and the pump 61 is activated to inject the hypobromous acid-containing liquid into the agitating tank 63. While the amount of the influent injected is kept uniform, an activation duration of the pump 61 may be determined by calculating from the flow rate of the pump 61, or may be decided by a water level of the agitating tank 63. When the activation duration of the pump 61 is decided by the water level of the agitating tank, the water level of the agitating tank 63 is measured using a level meter and the like, whereby the pump 61 may be controlled automatically. Or, the operator may monitor the agitating tank 63 to control the pump 63 manually. Hereinafter, this step is referred to as a hypobromous acid injecting step. After the predetermined amount of the hypobromous acid-containing liquid is injected into the agitating tank 63, the pump 61 is stopped, the motor 71 is activated to rotate the agitating tank 63, whereby the hypobromous acid-containing liquid and the zeolite powder 72 are agitated. At this time, the ammonia nitrogen adsorbed to the zeolite powder 72 and the hypobromous acid are reacted, whereby the ammonia nitrogen is converted into the nitrogen gas, which is diffused to atmosphere through the exhaust. The agitation is continued until the ammonia nitrogen adsorbed to the zeolite powder 72 is fully converted into the nitrogen gas. The motor 71 may be controlled by a time required to fully convert the ammonia nitrogen adsorbed to the zeolite powder 72 to the nitrogen gas that is determined by conducting an experiment under the same condition in advance. The motor 71 may be controlled automatically by an automatic device using a time control means and a means for measuring the concentration of the ammonia nitrogen, or manually by the operator.

After the above-mentioned denitrification step is completed, the side wall of the agitating tank 63 is slid to open the holes to separate the zeolite powder 72 and the solution. The solution within the agitating tank 63 is transferred to the outer tank 64 by centrifugal force. The zeolite powder 72 cannot pass through the holes of the side wall of the agitating tank 63, and remains in the agitating tank 63. The side wall of the agitating tank 63 may be slid after the motor 71 is stopped temporarily, and the rotation of the agitating tank 63 is stopped. In this case, the motor 71 is, however, needed to be reactivated. Hereinafter, this step is referred to as a zeolite dewatering step. This step is continued until the solution in the agitating tank 63 is entirely transferred to the outer tank 64. A zeolite dewatering step duration may be controlled automatically by the time determined by conducting an experiment under the same condition in advance, and by an automatic device using a time controlling means; or may be controlled manually with the operator by monitoring the agitating tank 63. In order to fully separate the solution within the agitating tank 63, the revolution speed of the agitation tank 63 may be greater than that in the denitrification step. After the predetermined zeolite dewatering duration is completed, the motor 71 is stopped, the three way valve 68 is operated to connect the discharge line 65 and the hypobromous acid-containing liquid discharge line 5, and the solution discharge valve 66 is open, and the pump 67 is activated whereby the hypobromous acid-containing liquid within the outer tank 64 is discharged. An activation duration of the pump 67 is until the hypobromous acid-containing liquid within the outer tank 64 is fully discharged, and may be determined by calculating from the amount of the hypobromous acid-containing liquid and the flow rate of the pump 67, or may be decided by a water level of the outer tank 64. When the activation duration of the pump 67 is decided by the water level of the outer tank 64, the water level of the outer tank 64 is measured using a level meter and the like, whereby the pump 67 may be controlled automatically. Or, the operator may monitor the outer tank 64 to control the pump 67 manually. Hereinafter, this step is referred to as a hypobromous acid-containing liquid discharging step. After the hypobromous acid-containing liquid within the outer tank 64 is fully discharged, the pump 67 is stopped, the discharge valve 66, the gas exhaust valve 74 and the holes of the side wall of the agitating tank 63 are closed, and the three way valve 69 is operated to connect the solution injection line 62 and the influent injection line 4. After that, the operation is returned to the influent injection step. Repeating the above-described operation can remove the ammonia nitrogen in the influent repeatedly.

According to such treatment apparatus, the motor 71 is stopped between respective steps, and the rotation of the agitating tank 63 is stopped temporarily. However, the agitating tank 63 may be rotated continuously without stopping the motor 71. The next step is done after the previous step is completed. However, these steps may be conducted at the same time, depending on a combination of the steps. For example, the zeolite dewatering step and the treated water and the hypobromous acid discharging step, the treated water discharging step and the hypobromous acid injecting step, and the hypobromous acid discharging step and the influent injecting step and the like may be conducted at the same time. A treating speed can be enhanced by suitably performing the continuous rotation of the agitating tank 63, and combining the steps, as described above.

Embodiment 19

Figure 23:
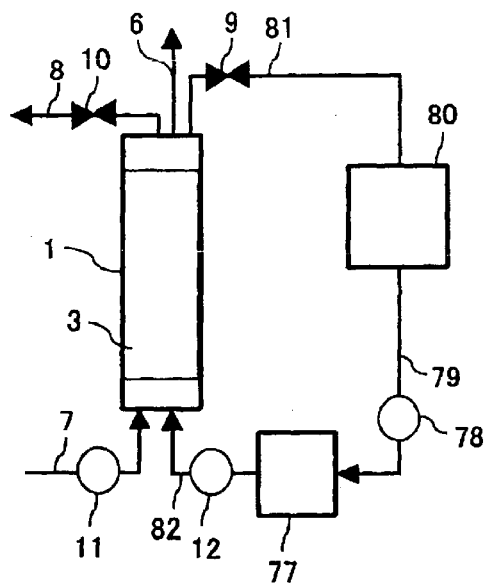

FIG. 23 shows an example showing a configuration explanation drawing of an apparatus of treating a nitrogen compound-containing water according to the present invention. Such treatment apparatus is composed of the zeolite 3, a adsorbing tower 1 filled with the zeolite 3, an electrolytic cell 77, and a sodium chloride storing tank 80.

The adsorbing tower 1 has two inlets and two outlets. To the inlets, the influent injection line 7 and a hypochlorous acid solution supply line 82 are connected. To the outlets, the treated water discharge line 8 and a sodium chloride solution recycling line 81 are connected. The hypochlorous acid solution supply line 82 is connected to the sodium chloride storing tank 80 via the pump 12, the electrolytic cell 77, the pump 78 and a sodium chloride solution supply line 79. In such apparatus of treating a nitrogen compound-containing water, the sodium chloride solution supplied from the sodium chloride storing tank 80 is electrolyzed in the electrolytic cell 77 to produce the hypochlorous acid solution, which can be supplied to the adsorbing tower 1. At the top of the adsorbing tower 1, the nitrogen gas outlet 6 is disposed to discharge the nitrogen gas produced within the adsorbing tower. The valve 10 is attached to the treated water discharge line 8, and the valve 9 is attached to the sodium chloride solution recycling line 81. By operating the valves, the discharge path of the solution within the adsorbing tower 1 may be selected. The pump 11 is attached to the influent injection line 7, and the pump 12 is attached to the hypochlorous acid solution supply line 82. Using these, the influent or the hypochlorous acid solution is supplied to the adsorbing tower 1.

Then, the operation of the apparatus will be described. In such apparatus of treating a nitrogen compound-containing water, firstly while the valve 9 is closed, and the valve 10 is open, the pump 11 is activated, the influent is injected into the adsorbing tower 1 through the influent injection line 7, and the ammonia nitrogen in the influent is adsorbed to the zeolite 3. Thus, the ammonia nitrogen is removed from the influent to provide treated water, which is sequentially discharged from the treated water discharge line 8. Hereinafter, this operation is referred to as the adsorbing step.

After the predetermined time is elapsed, the pump 11 is stopped, the valve 10 is closed, and the valve 9 is open. Then, the pump 12 is activated, and the hypochlorous acid-containing liquid is injected into the adsorbing tower 1 through the hypochlorous acid solution supply line 82. The hypochlorous acid-containing liquid is produced in advance by sending the sodium chloride solution stored in the sodium chloride storing tank 80 to the electrolytic cell 77 with the pump 78 through the sodium chloride solution supply line 79, and electrolyzing it.

The hypochlorous acid-containing liquid passes through the adsorbing tower 1, and is discharged from the sodium chloride solution recycling line 81. At this time, the ammonia nitrogen adsorbed to the zeolite 3 is converted into the nitrogen gas by oxidation with hypochlorous acid, and the nitrogen gas is discharged to atmosphere from the nitrogen gas outlet 6. The hypochlorous acid in the hypochlorous acid-containing liquid is converted into chlorine ions, which are reacted with sodium in the liquid to provide sodium chloride. The ammonia nitrogen is converted into the nitrogen gas, whereby the zeolite 3 has recovered ability to adsorb the nitrogen compound. Hereinafter, this step is referred to as a denitrification step.

Repeating the above operation can remove the ammonia nitrogen in the influent repeatedly, whereby a method of treating nitrogen-containing water is realized using low-cost hypochlorous acid. The use of the zeolite as the adsorbent of the nitrogen compound can increase the concentration of the ammonia nitrogen, and proceed the reaction efficiently, as compared with a liquid phase reaction conventionally used in the method of treating the nitrogen-containing water. The apparatus can be small-sized, and the hypochlorous acid consumption can be decreased, whereby the costs can be further decreased. In addition, when the oxidizer-containing liquid is electrolyzed before the oxidizer-containing liquid is recycled, the oxidizer-containing liquid can be utilized efficiently.

In the present embodiment, two inlets and two outlets are disposed at the adsorbing tower 1. One inlet and one outlet may be disposed, and a three way valve may be disposed to select inlet and outlet paths. The electrolysis is used to produce the hypochlorous acid. Any means can be used as long as the hypochlorous acid is produced. For example, electrodialysis may be used instead thereof. As the raw material for producing the hypochlorous acid, a chloride having electrolytic dissociation property can be used. Representative example include sodium chloride, potassium chloride, calcium chloride and the like. As the oxidizer, the hypochlorous acid is used. The hypobromous acid can be used. As the raw material, a bromide having electrolytic dissociation property can be used. Representative examples include sodium bromide, potassium bromide, calcium bromide and the like.

As the adsorbent of the ammonia nitrogen, the zeolite is used. Any adsorbent having a property to adsorb the ammonia nitrogen can be applicable. Examples include an aluminum silicate compound, ammonium silicates, zeolites such as clinoptilolite and mordenite, clay minerals, silica alumina minerals such as clinoptilolite, mordenite, montmorillonite, sepiolite, bentonite and illite, calciums such as calcium oxide, calcium carbonate, calcium hydroxide, tuff, dolomite, and lime, activated cokes, inorganic ion exchangers such as strong acid ion exchange resin, and weak acid ion exchange resin, magnesia adsorbents, activated carbon, charcoal, terra abla, zirconium based fine ceramics and the like. Especially when the inorganic adsorbent such as clinoptilolite, montmorillonite, ion exchange resin is used instead of the zeolite, the oxidizer, which is used for converting the ammonia nitrogen into the nitrogen gas, less affects the adsorbent, i.e., less deteriorates the adsorbent, that might be expected when the organic adsorbent is used. The ammonia nitrogen is adsorbed stably, and is surely converted into the nitrogen gas.

As the adsorbing means, a vertical type fixed bed adsorbing apparatus is used. The fixed bed adsorbing apparatus may be a horizontal type, or a radial flow type. As the adsorbing means, not only the fixed bed adsorbing apparatus, but also an alternating or crossflow (crossing) type moving bed adsorbing apparatus, fluidized bed adsorbing apparatus, and the like may be used to provide the same advantages. For example, with the configuration that the moving bed adsorbing apparatus 76 as shown FIG. 22 is used instead of the adsorbing tank 1, the operation in EMBODIMENT 18 can be conducted. In this embodiment, the sodium chloride solution recycling line 81 is disposed. However, the apparatus shown in FIG. 5 may be used in this embodiment, and sodium chloride may not be recycled. In this case, it requires a mechanism that a new sodium chloride solution is supplied. The sodium bromide solution storing tank 18, the sodium bromide solution supply line 19, and the pump 23 are needed as shown in FIG. 5.

In this embodiment, the sodium chloride solution recycling line 81 is connected to the sodium chloride storing tank 80. Alternatively, the sodium chloride solution recycling line 81 may be directly connected to the electrolytic cell 77. In this case, the sodium bromide solution storing tank 18, the sodium bromide solution supply line 19, and the pump 23 as shown in FIG. 5 may be added, the sodium chloride solution recycled and a new sodium chloride solution may be combined to inject into the electrolytic cell 77.

In the present embodiment, the pH meter 25, the hydrochloric acid storing tank 26, the sodium hydroxide storing tank 27, and the three way valve 28 may be added as shown in the apparatus of FIG. 6. An inlet may be disposed at the top of the electrolytic cell 77, which is connected to the hydrochloric acid storing tank 26 and the sodium hydroxide storing tank 27 via the three way valve 28. Thus, the same advantages can be obtained as in EMBODIMENT 3. In this embodiment, when hypochlorous acid is used, the production of chloric acid is prevented, and when hypobromous acid is used, the production of bromic acid is prevented.

In this embodiment, the discharge valve 37 may be attached to the adsorbing tank 1 as shown in the apparatus of FIG. 8. The solution within the adsorbing tank 1 can be easily discharged from the discharge valve 37, whereby the same advantages can be obtained as in EMBODIMENT 5.

In this embodiment, the solution used for the denitrification may be contain hypochlorous acid or hypobromous acid and sodium ions as in EMBODIMENT 8, whereby the same advantages can be obtained as in EMBODIMENT 8. It is also confirmed that the effect of the sodium ion concentration contained in the hypochlorous acid or the hypobromous acid on the conversion efficiency of the ammonia nitrogen is same as shown in FIG. 12.

In this embodiment, the denitrification tank 13 may be included as in the apparatus shown in FIG. 13, whereby the same advantages can be obtained as in EMBODIMENT 9.

In this embodiment, the shower 52 is attached within the adsorbing tank 1, and the washing water supply line 53 is connected thereto as in the apparatus shown in FIG. 14. It is configured so that the adsorbent within the adsorbing tank 1 can be washed with the washing water, which is supplied through the washing water supply line 53, using the shower 52, whereby the same advantages can be obtained as in EMBODIMENT 10. As the washing method, the washing water jets from the shower 52. A washing water inlet and a washing water outlet may be disposed at the top and bottom of the adsorbing tank 1, and the washing water may pass through the adsorbent 3 to provide the same advantages. In this case, an injection direction of the washing water may be upward or downward.

In this embodiment, when hypobromous acid is used instead of hypochlorous acid, the activated carbon tank 32 and the activated carbon 33 are attached to the sodium chloride-containing liquid recycling line 81 as in the apparatus shown in FIG. 15, whereby the same advantages can be obtained as in EMBODIMENT 11. When the hypochlorous acid is used, harmful chloric acid can be removed by the configuration.

In this embodiment, when hypochlorous acid is used, a chlorine ion concentration meter is attached to the sodium chloride solution recycling line 81, or when hypobromous acid is used, the bromine ion concentration meter 34 is attached to the sodium chloride solution recycling line 81 as in the apparatus shown in FIG. 16. It is configured so that the pump 78 and the electrolytic cell 77 are controlled by its measured value. Thus, the same advantages can be obtained as in EMBODIMENT 12.

In this embodiment, the pH meters 38, 39 are attached to the influent injection line 7 and the treated water discharge line 8, respectively as in the apparatus shown in FIG. 17. It is configured so that their measured value are taken into the controller 40, with which the pump 11 and the valve 10 are controlled, whereby the same advantages can be obtained as in EMBODIMENT 13.

In this embodiment, two adsorbing tanks are disposed, the three way valve 44 is attached to a hypochlorous acid solution supply line 83, the three way valve 42 is attached to the sodium chloride solution recycling line 81, the three way valve 43 is attached to the influent injection line 7, and the three way valve 41 is attached to the treated water discharge line 8. By controlling the switching of respective lines, the switching of the inlet path to the adsorbing tanks 1 and 45, and the outlet path from the adsorbing tanks 1 and 45 can be controlled. The steps conducted in EMBODIMENT 14 are conducted, whereby the same advantages can be obtained as in EMBODIMENT 14. It is configured so that the timer 47 is attached to the three way valves 41, 42, 43, 44 that switch respective lines as in the apparatus in FIG. 19. Using this, the switching of respective lines is controlled, whereby the adsorbing step and the denitrification step can be switched automatically, and it is possible to run the apparatus continuously. So, the same advantages can be obtained as in EMBODIMENT 15. Furthermore, the nitrogen concentration meter 48 is attached to the treated water discharge line 8 as in the apparatus shown in FIG. 20. It is configured so that the concentration of the ammonia nitrogen contained in the treated water is measured, and the three way valves 41, 42, 43, 44 are switched using the value. The steps conducted in EMBODIMENT 16 are conducted, whereby the same advantages can be obtained as in EMBODIMENT 16. In addition, when hypobromous acid is used, the chromaticity sensor 49 is attached to the sodium chloride solution recycling line 81, whereby the three way valves 41, 42, 43, 44 are switched as in the apparatus shown in FIG. 21. The steps conducted in EMBODIMENT 17 are conducted, whereby the same advantages can be obtained as in EMBODIMENT 17. The apparatus including more than two adsorbing tanks may provide the similar advantages. In proportion to the number of the adsorbing tanks included, the efficiency of treating water is improved. The three way valves are used for controlling respective lines. A valve may be attached to each branch of the lines, and may control the switching of the lines.

Embodiment 20

Figure 24:
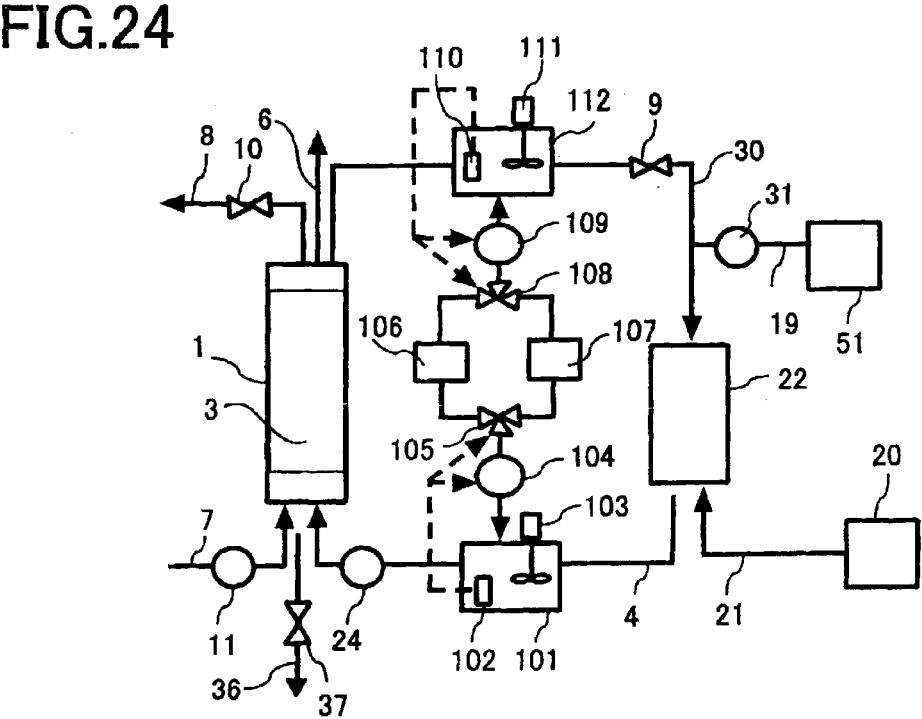

FIG. 24 shows an example showing a configuration explanation drawing of an apparatus of treating a nitrogen compound-containing water according to the present invention. Such treatment apparatus includes pH regulating tanks 101 and 102 disposed at the hypobromous acid-containing liquid supply line 4 and the bromine ion-containing liquid recycling line 30 shown in the apparatus of FIG. 7. The pH meter 102 and an agitator 103 are attached to the pH regulating tank 101. The pH regulating tank 101 is connected to a sodium hydroxide storage tank 106 and a sulfuric acid storage tank 107 via a pump 104 and a three way valve 105. The solution flowing through the hypobromous acid-containing liquid supply line 4 is temporarily stored in the pH regulating tank 101, and the pH thereof is measured with the pH meter 102. Depending on the pH value of the solution, the pump 104 and the three way valve 105 are controlled. The pH value of the solution within the tank is always kept at a constant value by adding the predetermined amount of sulfuric acid, sodium chloride, or the like while agitating with the agitator 103. The solution having the pH regulated is supplied to the adsorbing tank 1 by the pump 24.

In this embodiment, the pH of the solution flowing through the hypobromous acid-containing liquid supply line 4 is regulated due to the following reason. That is, ammonia and hypobromous acid are involved in the conversion of the ammonia nitrogen into the nitrogen gas within the adsorbing tank 1. However, the ammonia has a character that is dissociated to ammonium ions under acid condition, and the hypobromous acid has a character that is dissociated to hypobromous acid ions under basic condition. Accordingly, the pH of the hypobromous acid-containing liquid supplied to the adsorbing tank 1 is required to be kept neutral. In the apparatus of treating a nitrogen compound-containing water according to the present embodiment, the pH of the solution within the hypobromous acid-containing liquid supply line 4 is kept neutral by the pH regulating tank 101, whereby ionization of the ammonia and the hypobromous acid is prevented, and the nitrogen conversion efficiency of the ammonia nitrogen adsorbed to the adsorbent 3 can be improved.

A pH meter 110 and an agitator 111 are attached to the pH regulating tank 112. The pH regulating tank 112 is connected to a sodium hydroxide storage tank 106 and a sulfuric acid storage tank 107 via a pump 109 and a three way valve 108. The solution flowing through the bromine ion-containing liquid recycling line 30 is temporarily stored in the pH regulating tank 112, and the pH thereof is measured with the pH meter 110. Depending on the pH value of the solution, the pump 109 and the three way valve 108 are controlled. The pH value of the solution within the tank is always kept at a constant value by adding the predetermined amount of sulfuric acid, sodium chloride, or the like while agitating with the agitator 111. The solution having the pH regulated is returned to the hypobromous acid producing tank 22.

In this embodiment, the pH of the solution flowing through the bromine ion-containing liquid recycling line 30 is regulated due to the following reason. That is, as described above, the hypobromous acid is the hypobromous acid under acid or neutral condition, but has a character that is dissociated to hypobromous acid ions under basic condition. The hypobromous acid ion is easily reacted with ozone to produce bromic acid. The hypobromous acid having oxidizing property relates to the conversion of the ammonia nitrogen into the nitrogen gas. Accordingly, the pH of the hypobromous acid-containing liquid supplied to the hypobromous acid producing tank 22 is required to be kept neutral to acid. In the apparatus of treating a nitrogen compound-containing water according to the present embodiment, the pH of solution within the bromine ion-containing liquid recycling line 30 is kept neutral to acid by the pH regulating tank 112, whereby the production of the bromic acid in the hypobromous acid producing tank 22 is prevented, and the waste consumption of ozone can be prevented.

Although optimum pH conditions are different in the adsorbing tank 1 and the hypobromous acid producing tank 22, the configuration shown in FIG. 24 can satisfy both conditions, whereby the nitrogen conversion efficiency of the ammonia nitrogen is improved, the production of the bromic acid is prevented, and the waste consumption of ozone can be prevented.

In the present embodiment, two inlets and two outlets are disposed at the adsorbing tank 1. One inlet and one outlet may be disposed, and a three way valve may be disposed to select inlet and outlet paths.

The hypobromous acid is used to convert the ammonia nitrogen into the nitrogen gas. Any substances may be used without limitation as long as they have similar oxidizing properties. For example, a halide such as hypochlorous acid and chloric acid, halogen such as fluorine, chlorine, and bromine, ozone water, activated oxygen, oxo acid, hydrogen peroxide, potassium permanganate and the like.

As the adsorbent of the ammonia nitrogen, the zeolite is used. Any adsorbents may be used without limitation as long as they have a property to adsorb the ammonia nitrogen. Examples include an aluminum silicate compound, ammonium silicates, zeolites such as clinoptilolite and mordenite, clay minerals, silica alumina minerals such as clinoptilolite, mordenite, montmorillonite, sepiolite, bentonite and illite, calciums such as calcium oxide, calcium carbonate, calcium hydroxide, tuff, dolomite, and lime, activated cokes, inorganic ion exchangers such as strong acid ion exchange resin, and weak acid ion exchange resin, magnesia adsorbents, activated carbon, charcoal, terra abla, zirconium based fine ceramics and the like. Especially when the inorganic adsorbent such as clinoptilolite, montmorillonite, ion exchange resin is used instead of the zeolite, the oxidizer, which is used for converting the ammonia nitrogen into the nitrogen gas, less affects the adsorbent, i.e., less deteriorates the adsorbent, that might be expected when the organic adsorbent is used. The ammonia nitrogen is adsorbed stably, and is surely converted into the nitrogen gas.

As the adsorbing means, a vertical type fixed bed adsorbing apparatus is used. The fixed bed adsorbing apparatus may be a horizontal type, or a radial flow type. As the adsorbing means, not only the fixed bed adsorbing apparatus, but also an alternating or crossflow (crossing) type moving bed adsorbing apparatus, fluidized bed adsorbing apparatus, and the like may be used to provide the same advantages. The three way valves 105, 108 are controlled automatically using the pH values of the pH meters 102, 110. The operator may read the values of the pH meters, and may operate the three way valves 105, 108 manually. The pH meter is used as the means for measuring the pH. Other pH measuring means such as litmus paper can provides similar effects. In order to adjust the pH, sulfuric acid and sodium hydroxide are used. Other acid solutions and basic solutions such as hydrochloric acid, nitric acid, potassium hydroxide, calcium hydroxide and the like can be used. In order to agitate the solutions within the pH regulating tanks 101, 112, the agitators 103, 111 are used. There may be used an agitating means such as a stirrer, a static mixer, water stream agitation, addition of a circulation path using a circulation pump.

The present embodiment is described based on the apparatus shown in FIG. 7 alone. The apparatuses that include the adsorbing tank 1, the hypobromous acid production tank 22, and the line connecting the two tanks shown in FIGS. 9, 10, 15 and 16 can provide the same advantages described above by introducing the above-mentioned pH regulating means into the hypobromous acid-containing liquid supply line 4 and the bromine ion-containing liquid recycling line 30, in addition to the advantages obtained by the respective apparatuses.

Embodiment 21

Figure 25:
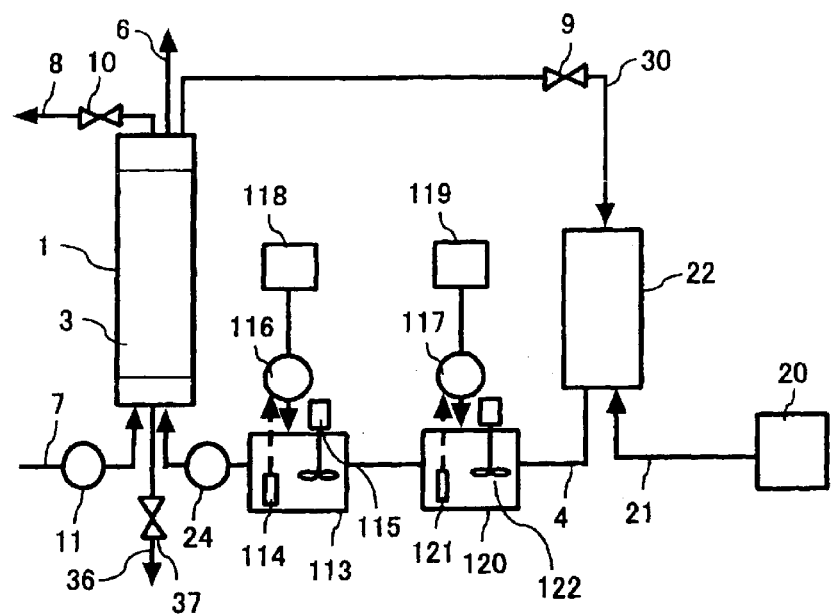

FIG. 25 shows an example showing a configuration explanation drawing of an apparatus of treating a nitrogen compound-containing water according to the present invention. A pH regulating tank 113 and a sodium regulating tank 120 are disposed at the hypobromous acid-containing liquid supply line 4 shown in the apparatus of FIG. 7. A pH meter 114 and an agitator 115 are attached-to the pH regulating tank 113. The pH regulating tank 113 is connected to a sulfuric acid storage tank 118 via a pump 116. A pH meter 121 and an agitator 122 are attached to the sodium regulating tank 120. The sodium regulating tank 120 is connected to a sodium hydroxide storage tank 119 via a pump 117. The solution flowing through the hypobromous acid-containing liquid supply line 4 is temporarily stored in the sodium regulating tank 120, and the pH thereof is measured with the pH meter 121. Depending on the pH value of the solution, the pump 117 is controlled. The concentration of the sodium ion in the solution within the tank is always kept at a constant value by adding the predetermined amount of sodium hydroxide while agitating with the agitator 120. After that, the solution is sent to the pH regulating tank 113, and its pH is measured again by the pH meter 114. Depending on the pH value of the solution, the pump 116 is controlled. The pH of the solution within the tank is always kept at a constant value by adding the predetermined amount of sulfuric acid while agitating with the agitator 115. The solution having the pH regulated is supplied to the adsorbing tank 1 by the pump 24.

Such configuration is selected due to the following reason. That is, the sodium ion has functions to improve the ability of the zeolite for adsorbing the ammonia nitrogen, and to promote the desorption of the ammonia nitrogen from the zeolite, as described in EMBODIMENT 8. When the sodium ions are included in the hypobromous acid-containing liquid, the speed of the denitrification of the ammonia nitrogen (attributed to hypobromous acid) and the speed of the desorption from the zeolite (attributed to sodium ions) are balanced. Thus, the nitrogen conversion efficiency of the ammonia nitrogen is improved. When the sodium ions are included in the hypobromous acid-containing liquid, ammonia nitrogen adsorbing ability of the zeolite is also improved. After the ammonia is desorbed by the zeolite, the sodium ions are adsorbed to the zeolite instead of the ammonia desorbed, and is desorbed to the influent in the next adsorbing step to flow outside of the system together with the treated water. It is, therefore, needed to always supply the sodium ions into the hypobromous acid-containing liquid. However, with the configuration shown in FIG. 25, the concentration of the sodium ion in the solution within the sodium regulating tank 120 is kept uniform, whereby the concentration of the sodium ion in the hypobromous acid-containing solution can be preferably kept uniform.

In the present embodiment, sodium hydroxide is used for supplying the sodium ion. Any solutions may be used without limitation as long as they contain the sodium ion. Sodium bromide and sodium chloride can be applicable.

The pH meter 121 is introduced into the sodium regulating tank 120, but may be introduced into the bromine ion-containing liquid recycling line 30.

The reason of regulating the pH of the nitrogen compound-containing water in this embodiment is the similar to that described in EMBODIMENT 20.

Embodiment 22

Figure 26:
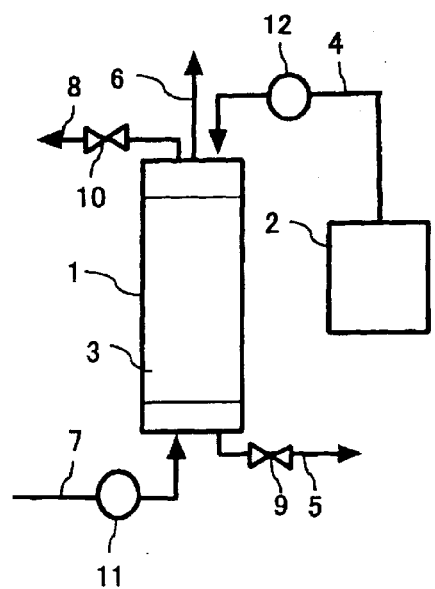

FIG. 26 shows an example showing a configuration explanation drawing of an apparatus of treating a nitrogen compound-containing water according to the present invention. The hypobromous acid-containing liquid supplied to the adsorbing tank of the apparatus shown in FIG. 2 flows downward.

When the influent is supplied to the adsorbing tank 1 from the bottom, the concentration of the ammonia nitrogen adsorbed at a lower portion of the adsorbent 3 is high, and that adsorbed at an upper portion of the adsorbent 3 is low. Therefore, the hypobromous acid-containing liquid is supplied from the top, whereby a difference in the concentrations of the sodium ion in the ammonia nitrogen, the hypobromous acid and the hypobromous acid-containing liquid becomes great. Thus, the desorption efficiency of the ammonia nitrogen from the zeolite, and the nitrogen conversion efficiency of the ammonia nitrogen are improved.

In the present embodiment, the pump 12 is used to supply the hypobromous acid-containing liquid from the top of the adsorbing tank 1. The hypobromous acid-containing liquid storage tank 2 may be fixed above of the adsorbing tank 1 to supply the hypobromous acid-containing liquid to the adsorbing tank 1 utilizing the static pressure of the hypobromous acid-containing liquid.

In this embodiment, the influent supplied to the adsorbing tank 1 flows upward, and the hypobromous acid containing liquid supplied to the adsorbing tank 1 flows downward. However, the hypobromous acid-containing liquid supplied to the adsorbing tank 1 may flow upward, and the influent supplied to the adsorbing tank 1 may flow downward, which can provide the same advantages.

The present embodiment is described based on the apparatus shown in FIG. 2. The apparatuses in which the hypobromous acid-containing liquid flows downward shown in FIGS. 5 to 11, 13 to 25 can provide the same advantages.

Embodiment 23

Figure 27:
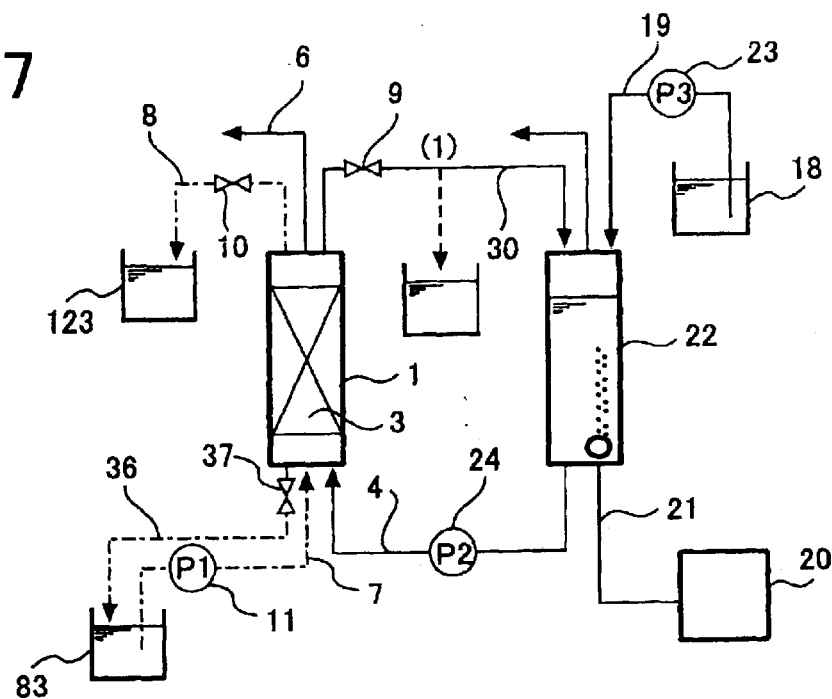

In order to fix operational conditions for use in the present invention, the apparatus shown in FIG. 27 based on the apparatus shown in FIG. 9 is used to experiment as described below. In FIG. 27, a dashed line represents an ammonia water supply line, and a chain double-dashed line represents a discharge line. A flow rate of each of the pump 11 and the pump 24 is 10 mL/min, a concentration of $NH_4$—N in an ammonia-containing water storage tank 83 is 100 mgN/L, a concentration of Br in the sodium bromide solution storing tank 18 is 600 mgBr/L, a concentration and a flow rate of ozone in the ozonizer 20 are 50 mg/L and 0.7 L/min, respectively, and an amount of the solution in the hypobromous acid producing tank 22 is 1 L. When the experiment is started, all lines are closed. Operation steps are described below.

Firstly, the ammonia water supply line 7 represented by the dashed line in FIG. 27 is open. The pump 11 is activated. The ammonia containing liquid is injected into the bottom of the adsorbing tank 1 filled with the zeolite 3. The solution discharged from the top of the adsorbing tank 1 is stored in a storage tank 123 as the treated water. When the ammonia passed through the adsorbing tank 1, it is adsorbed to the zeolite 3. The above step referred to as an adsorbing step.

Then, the ammonia water supply line 7 is closed, and pump 11 is stopped. The discharge line 36 and the discharge valve 37 represented by the chain double-dashed line in FIG. 27 are open. The ammonia water is discharged from the adsorbing tank 1. After that, the discharge valve 37 and the discharge line 36 are closed, the hypobromous acid-containing liquid supply line 4 is open, and the ozonizer 20 and the pumps 23, 24 are activated. The solution containing sodium ions and bromine ions supplied by the pump 23 is contacted with ozone supplied from the ozonizer 20 within the hypobromous acid production tank 22 to convert it into the solution containing hypobromous acid and the sodium ion, which is injected into the adsorbing tank 1 by the pump 24. At this time, the ammonia adsorbed to the zeolite 3 within the adsorbing tank 1 is denitrified by the hypobromous acid to be nitrogen gas, which is diffused to atmosphere through the nitrogen gas outlet 6. At the same time, the hypobromous acid is converted into bromine ions. The bromine ion-containing water discharged from the adsorbing tank 1 is returned to the hypobromous acid producing tank 22 through the recycling line 30. The pump 23 is stopped directly before the bromine ion-containing water is recycled. The above step is referred to as a denitrification step.

After all ammonia in the adsorbing tank 1 is converted into nitrogen, the pump 24 is reverse-rotated to return all hypobromous acid in the adsorbing tank 1 to the hypobromous acid producing tank 22. After that, the hypobromous acid-containing liquid supply line 4 is closed, and the ozonizer 20 and the pump 24 are stopped.

The above operation is one treatment cycle. An ammonia concentration of the treated water, a hypobromous acid (HBrO), a sodium ion concentration ($Na^+$), a bromine ion ($Br^-$) concentration, a bromic acid ($BrO_3^-$) concentration and pH of the hypobromous acid-containing liquid, a hypobromous acid (HBrO) concentration, a sodium ion concentration ($Na^+$), a bromine ion ($Br^-$) concentration and pH in the bromine ion-containing water and the like per treatment cycle are measured. As a result, the following relation is found.

Figure 28:
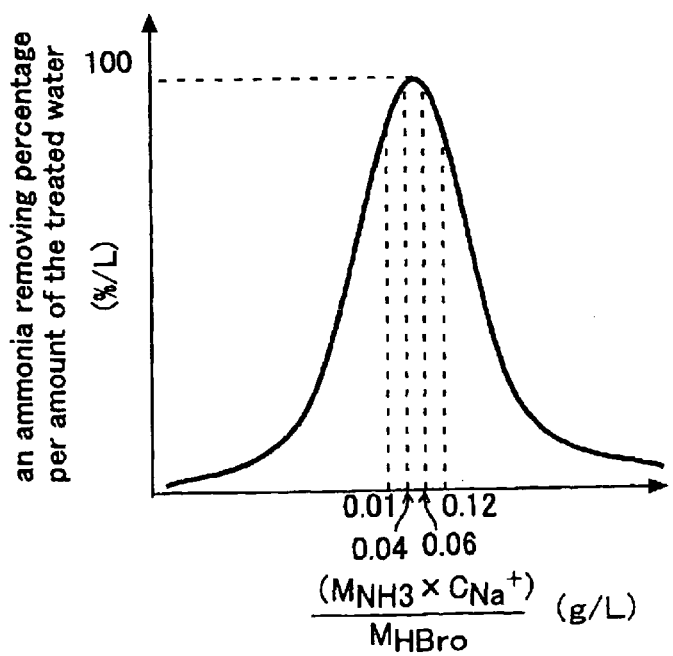
FIG. 28 is a graph showing an ammonia treatment ability of apparatuses of treating a nitrogen compound-containing water according to the present invention.

In one treatment cycle, there is a relation between an ammonia removing percentage per amount of the treated water and $(M_{NH3} \times C_{Na+})/M_{HBrO}$ as shown in FIG. 28, where $M_{NH3}$ (g) is an amount of ammonia adsorbed to the zeolite, $M_{HBrO}$ (g) is an amount of HBrO supplied to the adsorbing tank in the denitrification step, $C_{Na+}$ (g/L) is a concentration of $Na^+$ contained in the hypobromous acid-containing liquid. As shown in FIG. 28, when $(M_{NH3} \times C_{Na+})/M_{HBrO}=0.01$ to 0.12, the ammonia in the waste water can be efficiently treated. Furthermore, $(M_{NH3} \times C_{Na+})/M_{HBrO}=0.04$ to 0.06 is most suitable.

Embodiment 24

The experiment is conducted as in EMBODIMENT 23. The relation described below is obtained.

Figure 29:
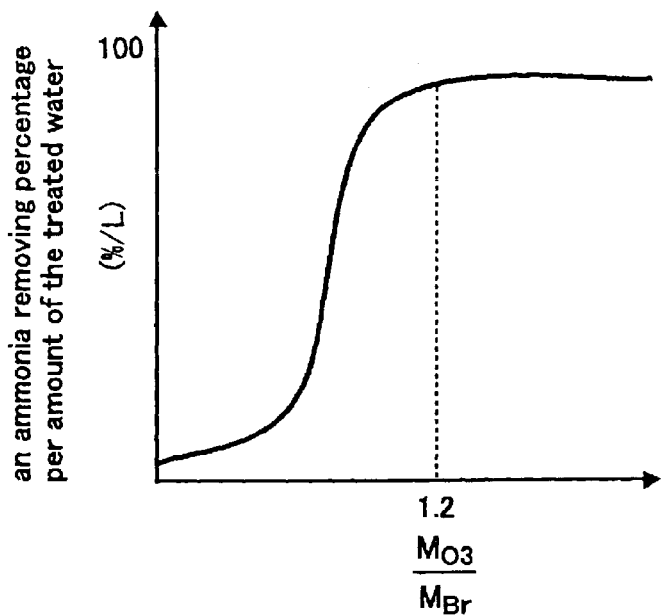
FIG. 29 is a graph showing a relation among an amount of bromine ions in bromine ion-containing water provided to a tower for producing bypobromous acid, an ozone supply amount, and an ammonia removing percentage.
Figure 30:
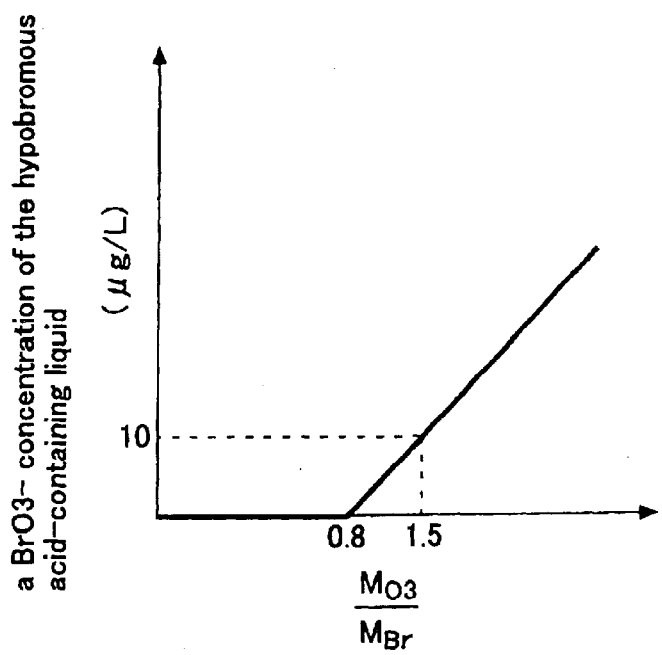
FIG. 30 is a graph showing a relation among a $BrO_3^-$ concentration, an ion content of bromic acid, and an ozone supply amount.
Figure 31:
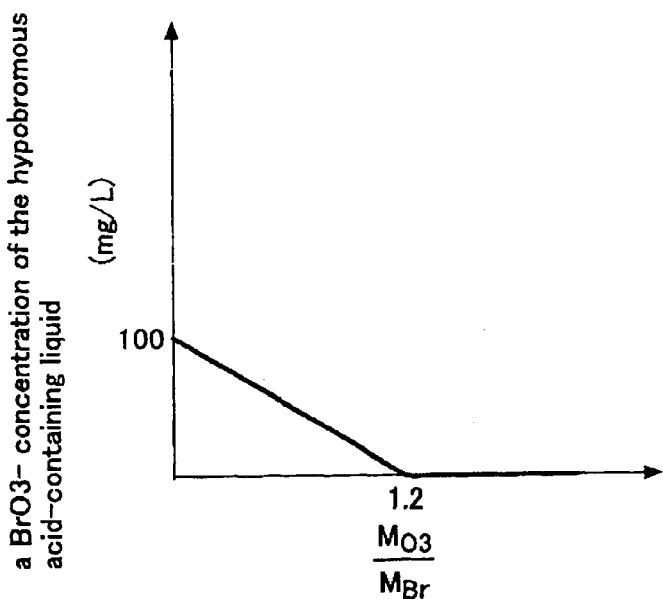
FIG. 31 is a graph showing a relation among $Br^-$ concentration in a hypobromous acid solution, ion content of bromic acid, and ozone supply amount.

There is a relation between an ammonia removing percentage per amount of the treated water and $M_{O3}/M_{Br}$ as shown in FIG. 29, where $M_{Br}$ (g) is an amount of Br in the bromine ion-containing water supplied to the hypobromous acid producing tank in the denitrification step, and $M_{O3}$ (g) is an amount of ozone supplied to the hypobromous acid producing tank in the denitrification step. There is a relation between a $BrO_3^-$ concentration of the hypobromous acid-containing liquid and $M_{O3}/M_{Br}$ as shown in FIG. 30. There is a relation between a $Br^-$ concentration of the hypobromous acid-containing liquid and $M_{O3}/M_{Br}$ as shown in FIG. 31. As shown in FIG. 29, when $M_{O3}/M_{Br}=1.2$ or more, the ammonia in the waste water can be efficiently treated. As shown in FIG. 30, when $M_{O3}/M_{Br}=1.5$ or less, a concentration of a by-product $BrO_3^-$ is 10 μg/L or less according to the present invention, which is the maximum acceptable concentration of $BrO_3^-$ in tap water (disinfection reagent/disinfection by-products regulation (D/DBP rule) by the United States Environmental Protection Agency (USEPA)). Also, when $M_{O3}/M_{Br}=0.8$ or less, no $BrO_3^-$ is produced not at all. As shown in FIG. 31, when $M_{O3}/M_{Br}=1.2$ or more, $Br^-$ is not contained in the hypobromous acid-containing liquid, and an excess administration of $Br^-$ can be prevented according to the present invention.

As described above, according to the present invention, it is found that the ammonia in the waste water can be efficiently and safely treated, when $M_{O3}/M_{Br}=0.8$ to 1.5. Furthermore, $M_{O3}/M_{Br}=0.8$ to 1.2 is most suitable for treating the ammonia in the waste water more efficiently and safely.

Embodiment 25

The experiment is conducted as in EMBODIMENT 23. The relation described below is obtained.

Figure 32:
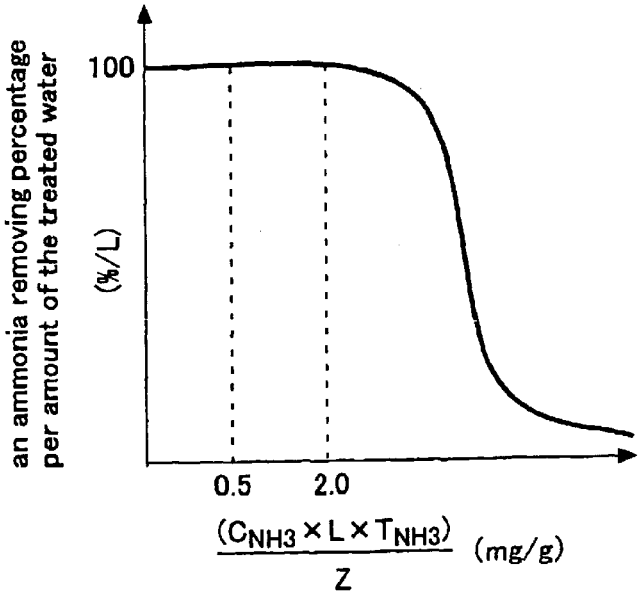
FIG. 32 is a graph showing a relation among ammonia concentration in influent, an amount of treated water, adsorbing step duration, amount of zeolite, and ammonia removing percentage.

There is a relation between an ammonia removing percentage per amount of the treated water and $(C_{NH3} \times L \times T_{NH3})/Z$ as shown in FIG. 32, where $C_{NH3}$ (mg/L) is a concentration of the ammonia in the influent, L (L/min) is an amount of the treated water, $T_{NH3}$ (min) is an adsorbing step duration, and Z (g) is an amount of the zeolite. As shown in FIG. 32, when $(C_{NH3} \times L \times T_{NH3})/Z = 2.0$, the ammonia in the waste water can be efficiently treated. Furthermore, $(C_{NH3} \times L \times T_{NH3})/Z = 0.5$ to 2.0 is most suitable, since an excess administration of the zeolite can be prevented.

Embodiment 26

The experiment is conducted as in EMBODIMENT 23. The relation described below is obtained.

Figure 33:
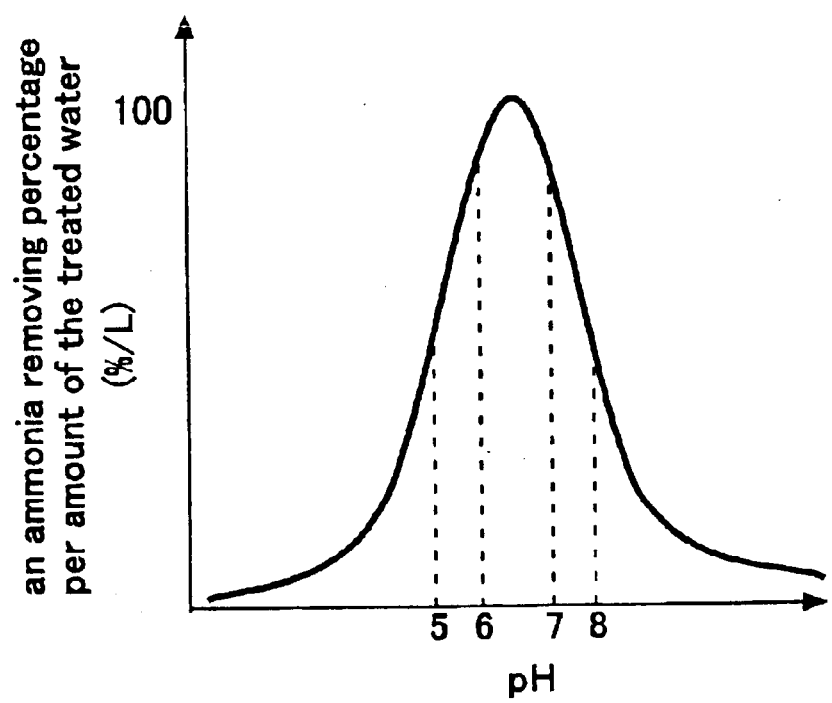
FIG. 33 is a graph showing a relation between ammonia removing percentage and pH value of a solution containing hypobromous acid.

There is a relation between an ammonia removing percentage per amount of the treated water and a pH of the hypobromous acid-containing liquid as shown in FIG. 33. When the pH becomes low, the ammonia is converted into ammonium ions. The ammonium ions have poor reactivity. It is desirable that the pH be high in view of the ammonia. When the pH becomes low, HBrO is converted into $BrO^-$. The $BrO^-$ is not reacted with the ammonia. It is desirable that the pH be low in view of the HBrO. As shown in FIG. 33, when the pH of the hypobromous acid-containing liquid is 5 to 8, the ammonia in the waste water can be efficiently treated. Furthermore, the pH of the hypobromous acid-containing liquid is most suitably 6 to 7.

INDUSTRIAL APPLICABILITY

According to the present invention, a method of treating a nitrogen compound-containing water comprises the steps of: adsorbing a nitrogen compound in the nitrogen compound-containing water to an adsorbent by contacting the nitrogen compound-containing water with the adsorbent, and decomposing the nitrogen compound by treating the adsorbent to which the nitrogen compound is adsorbed with an oxidizer-containing liquid, whereby the nitrogen compound with the low concentration contained in the waste water is adsorbed to the adsorbent to increase the concentration, after that, the decomposition reaction with the oxidizer can be conducted and it is possible to efficiently treat the nitrogen compound such as the ammonia nitrogen contained in the industrial waste water and the sewage. The adsorption of the nitrogen compound to the adsorbing means and the decomposition of the nitrogen compound by the hypobromous acid are performed in separated steps, whereby it can be prevented to flow the hypobromous acid of the oxidizer outside of the treatment apparatus, and it can be provided the method of treating a nitrogen compound-containing water having high safety to the external environment.

When the treatment method is applied to the ammonia nitrogen, ammonium salts, analogous ammonia structures, or a mixture thereof, the nitrogen compound is decomposed by the oxidizer to produce harmless nitrogen. It can be provided the method of treating a nitrogen compound-containing water with high safety.

When the hypobromous acid is used as the oxidizer, no residual compounds are produced upon the nitrogen production. It can be provided the method of treating a nitrogen compound-containing water with easy maintenance and having high safety.

According to the method of treating the nitrogen compound-containing water, when the oxidizer-containing liquid used in the decomposing step is recycled for decomposing a nitrogen compound, the consumption of the oxidizer can be reduced. When the oxidizer-containing liquid is ozonized before the oxidizer-containing liquid is recycled, the oxidizer can be easily regenerated. In addition, when the oxidizer-containing liquid used for the decomposing contains bromine ions, it can be preferably regenerated to hypobromous acid by ozonization.

When the inorganic adsorbent is used as the adsorbent in the method of treating a nitrogen compound-containing water, it can be provided the method of treating a nitrogen compound-containing water with high reliability with no deterioration in the adsorbing property of the adsorbent by the oxidizer and the like. Especially when the inorganic adsorbent is any of zeolite, activated carbon, ion exchange resin, or a combination thereof, the ammonia nitrogen can be preferably adsorbed stably, and be converted into the nitrogen gas.

The apparatus of treating a nitrogen compound-containing water in the present embodiment comprises an introduction path for the nitrogen compound-containing water, an adsorbing means containing an adsorbent connected to the introduction path at one end and to a discharge path at the other end, a influent supplying means for introducing the nitrogen compound-containing water from the introduction path to the adsorbing means, adsorbing a nitrogen compound contained in the nitrogen compound-containing water, and then discharging it to the discharge path, and an oxidizer supplying means connected to the adsorbing means for introducing an oxidizer-containing liquid into the adsorbing means after the nitrogen compound is adsorbed, contacting the oxidizer-containing liquid with the adsorbent for a predetermined time, and decomposing the nitrogen compound adsorbed to the adsorbent, whereby the concentration of the nitrogen compound slightly contained in the waste water and the like can be increased by adsorbing it to the adsorbent. With the high concentration, the nitrogen compound can be decomposed by the oxidizer, whereby there can be provided the treatment apparatus with high decomposition efficiency. The harmful nitrogen compound can be decomposed to make harmless, and it can be provided the apparatus of treating a nitrogen compound-containing water with high safety.

When the treatment apparatus is applied to the ammonia nitrogen, ammonium salts, analogous ammonia structures, or a mixture thereof, the nitrogen compound is decomposed by the oxidizer to produce harmless nitrogen. It can be provided the apparatus of treating a nitrogen compound-containing water with high safety. When the hypobromous acid is used as the oxidizer, no residual compounds are produced upon the nitrogen production. It can be provided the method of treating a nitrogen compound-containing water with good maintenance performance and having high safety.

In the apparatus of treating a nitrogen compound-containing water according to the present invention, when it comprises an oxidizer-recycling means for recycling the oxidizer-containing liquid from the adsorbing means after the nitrogen compound is decomposed to recycle it for a decomposition of a nitrogen compound, the consumption of the oxidizer can be reduced.

In such apparatus, when it comprises an ozonization means for ozonizing the oxidizer-containing liquid by contacting ozone with the oxidizer-containing liquid before the oxidizer-containing liquid is recycled, the oxidizer can be easily regenerated.

In such treatment apparatus, when the oxidizer-containing liquid used for the decomposing contains bromine ions, and is converted into hypobromous acid by the ozonization, the regenerated hypobromous acid is utilized for the next decomposition of a nitrogen compound, whereby the consumption of the oxidizer for use in the decomposition of the nitrogen compound can be reduced.

In such treatment apparatus, it comprises a washing agent injection means for injecting the washing agent to the adsorbing means after the oxidizer-containing liquid is recycled, a washing agent draining means for draining the washing agent from the adsorbing means, a washing means for washing the adsorbing means by residing the washing agent to the adsorbing means for a predetermined time to decrease the amount of the oxidizer contained in the oxidizer containing liquid remained in the adsorbing means to a predetermined value or less. It can be provided the safety treatment apparatus that inhibits the risk of discharging the oxidizer outside.

In the treatment apparatus, the above-mentioned inorganic adsorbent may be used as the adsorbent. It can be provided the highly reliable treatment apparatus that inhibits the deterioration by the oxidizer when the organic adsorbent is used. When any of a zeolite, an activated carbon, an ion exchange resin, or a combination thereof is used as the inorganic adsorbent, it can be provided the treatment apparatus that adsorbs the nitrogen compound with high stability and convert it to the nitrogen gas with high efficiency and high reliability.

In the method of treating a nitrogen compound-containing water according to the present invention, when the oxidizer is hypochlorous acid or hypobromous acid produced by electrolysis, it can be provided the method of treating the nitrogen compound-containing water with low costs. When the oxidizer-containing liquid used in the decomposing step is recycled for decomposing a nitrogen compound, the costs are further decreased. When the oxidizer-containing liquid is electrolyzed before the oxidizer-containing liquid is recycled, the oxidizer-containing liquid can be utilized efficiently.

In such method, when the oxidizer-containing liquid used in the decomposing step contains chlorine ions or bromine ions, and is converted into hypochlorous acid or hypobromous acid by electrolysis, the oxidizer can be regenerated conveniently. When the adsorbent is an inorganic adsorbent, it can be provided the treatment method with high durability. When the inorganic adsorbent is any of a zeolite, an activated carbon, an ion exchange resin, or a combination thereof, the commercially available materials can be used. Especially when the inorganic adsorbent is either the zeolite, the activated carbon, or a combination thereof, it can be provided the treatment method with low costs.

In the apparatus of treating a nitrogen compound-containing water according to the present invention, when it comprises an electrolyzing means at an upper side of the oxidizer supplying means, and the oxidizer may be hypochlorous acid or hypobromous acid produced by the electrolysis, it can be provided the treatment apparatus that can provide the oxidizer with low costs. When it comprises an oxidizer-recycling means for recycling the oxidizer-containing liquid from the adsorbing means after the nitrogen compound is decomposed to recycle it for decomposition of a nitrogen compound, it can be provided the treatment apparatus that recycles the oxidizer easily. When the oxidizer-containing liquid used for the decomposing contains chlorine ions or bromine ions, and is converted into hypochlorous acid or hypobromous acid produced by electrolysis, it can be provided the treatment apparatus that recycles the oxidizer easily.

When such treatment apparatus comprises a washing agent injection means for injecting the washing agent to the adsorbing means after the oxidizer-containing liquid is recycled, a washing agent draining means for draining the washing agent from the adsorbing means, a washing means for washing the adsorbing means by residing the washing agent to the adsorbing means for a predetermined time to decrease the amount of the oxidizer contained in the oxidizer containing liquid remained in the adsorbing means to a predetermined value or less, it can be provided the treatment apparatus that separates the treated water and the oxidizer-containing adsorbent, the durability of the entire apparatus can be improved. When the inorganic adsorbent comprises any of a zeolite, an activated carbon, an ion exchange resin, or a combination thereof, commercially available materials can be used. Especially when the inorganic adsorbent comprises either the zeolite or the activated carbon, or a combination thereof, it can be provided the inexpensive treatment apparatus easily.

What is claimed is:

1. A method of treating water containing a nitrogen compound, comprising:
   adsorbing a nitrogen compound in water containing the nitrogen compound by contacting the water with an adsorbent, and
   decomposing the nitrogen compound by treating the adsorbent with the nitrogen compound adsorbed with a liquid containing an oxidizer.

2. The method according to claim 1, wherein the nitrogen compound is selected from the group consisting of ammonia, ammonium salts, analogous ammonia structures, and mixtures thereof.

3. The method according to claim 1, the oxidizer is hypobromous acid.

4. The method according to claim 1, including recycling the liquid containing an oxidizer.

5. The method according to claim 4, including ozonizing the liquid containing the oxidizer prior to recycling of the liquid containing the oxidizer.

6. The method according to claim 5, wherein the liquid containing an oxidizer contains bromine ions, and including converting the bromine ions into hypobromous acid in the ozonization.

7. The method according to claim 1, wherein the adsorbent is an inorganic adsorbent.

8. The method according to claim 7, wherein the inorganic adsorbent is selected from the group consisting of zeolite, activated carbon, ion exchange resin, and combinations thereof.

9. The method of claim 1, wherein the oxidizer is one of hypochlorous acid and hypobromous acid produced by electrolysis.

10. The method according to claim 9, including recycling the liquid containing the oxidizer for further decomposing a nitrogen compound.

11. The method according to claim 10, including electrolyzing the liquid containing the oxidizer before the liquid is recycled.

12. The method according to claim 11, wherein the liquid containing the oxidizer contains one of chlorine ions and bromine ions, and including converting the ions into one hypochlorous acid and hypobromous acid by electrolysis.

13. An apparatus for treating water containing a nitrogen compound, comprising:
    an introduction path for water containing a nitrogen compound, adsorbing means containing an adsorbent connected to the introduction path at a first end and to a discharge path at a second end,
    influent supplying means for introducing the water containing a nitrogen compound from the introduction path to the adsorbing means, adsorbing a nitrogen compound contained in the water, and discharging the water to the discharge path, and
    oxidizer supplying means connected to the adsorbing means for introducing a liquid containing an oxidizer-into the adsorbing means after the nitrogen compound is adsorbed, contacting the liquid containing the oxidizer with the adsorbent for a time, and decomposing the nitrogen compound adsorbed by the adsorbent.

14. The apparatus according to claim 13, wherein the nitrogen compound is selected from the group consisting of ammonia, ammonium salts, analogous ammonia structures, and mixtures thereof.

15. The apparatus according to claim 13, wherein the oxidizer is hypobromous acid.

16. The apparatus according to claim 13, comprising oxidant-recycling means for recycling the liquid containing the oxidizer from the adsorbing means after the nitrogen compound is decomposed for further decomposition of a nitrogen compound.

17. The apparatus according to claim 13, comprising electrolyzing means at an upper side of the oxidizer sup plying means, wherein the oxidizer is one of hypochlorous acid and hypobromous acid produced by electrolysis by the electrolyzing means.

18. The apparatus according to claim 17, comprising oxidizer-recycling means for recycling the liquid containing the oxidizer discharged from the adsorbing means, after the nitrogen compound is decomposed, for recycling of the liquid for further decomposition of a nitrogen compound.

19. The apparatus according to claim 17, wherein the liquid containing an oxidizer contains one of chlorine ions and bromine ions, and the oxidizer is one of hypochlorous acid and hypobromous acid produced by electrolysis of the chlorine ions or bromine ions.

* * * * *